United States Patent
Zhou

(10) Patent No.: US 11,983,897 B2
(45) Date of Patent: May 14, 2024

(54) CAMERA INTRINSIC RE-CALIBRATION IN MONO VISUAL TRACKING SYSTEM

(71) Applicant: Snap Inc., Santa Monica, CA (US)

(72) Inventor: Kai Zhou, Wr Neudorf (AT)

(73) Assignee: SNAP INC., Santa Monica, CA (US)

( * ) Notice: Subject to any disclaimer, the term of this patent is extended or adjusted under 35 U.S.C. 154(b) by 356 days.

(21) Appl. No.: 17/528,911

(22) Filed: Nov. 17, 2021

(65) Prior Publication Data
US 2023/0154044 A1    May 18, 2023

(51) Int. Cl.
*G06T 7/80* (2017.01)
*G06T 7/73* (2017.01)

(52) U.S. Cl.
CPC ............... *G06T 7/80* (2017.01); *G06T 7/73* (2017.01); *G06T 2200/04* (2013.01); *G06T 2200/24* (2013.01)

(58) Field of Classification Search
CPC ......... G06T 7/80; G06T 7/73; G06T 2200/04; G06T 2200/24; G06T 7/246; G06T 2027/0138; G06T 27/0172; G06T 1/0007; G06T 15/10; G06T 2207/3004; G06T 7/0002; G06T 7/70; G06T 17/00; G06T 2207/30244; G06T 2207/10016; G06T 2207/20081; G06T 2207/20084; G06T 5/006; G06T 7/11; G06T 7/194; G06T 7/292; G06T 2207/10012; G06T 2207/10021; G06T 2207/10028; G06T 2207/10036; G06T 7/33; G06T 7/215; G06T 7/136; G06T 7/13; G06T 7/12; G06T 7/00; G06T 5/50; G06T 5/00; G06T 3/4084; G06T 3/4038; G06T 3/00; G06T 7/593; G06T 7/85; G06T 19/006; G06T 15/205; G06T 7/60; G06T 19/00; G06T 2207/30004; G06T 2207/30108; G06T 2207/30232; G06T 7/0004; G06T 17/05;
(Continued)

(56) References Cited

U.S. PATENT DOCUMENTS 9,734,419 B1 *  8/2017  Ye ............................. G06T 7/85
2002/0105484 A1  8/2002  Navab et al.
(Continued)

OTHER PUBLICATIONS

"International Application Serial No. PCT US2022 050244, International Search Report dated Apr. 11, 2023", 5 pgs.
(Continued)

*Primary Examiner* — Nimesh Patel
(74) *Attorney, Agent, or Firm* — SCHWEGMAN LUNDBERG & WOESSNER, P.A.

(57) ABSTRACT

A method for adjusting camera intrinsic parameters of a single camera visual tracking device is described. In one aspect, a method includes accessing a temperature of a camera of the visual tracking system, detecting that the temperature of the camera exceeds a threshold, in response identifying one or more feature points that are located in a central region of an initial image, generating a graphical user interface element that instructs a user of the visual tracking system to move the visual tracking system towards a border region of the initial image, and determining intrinsic parameters of the camera based on matching pairs of the one or more detected feature points in the border region and one or more projected feature points in the border region.

20 Claims, 16 Drawing Sheets

(58) Field of Classification Search
CPC .......... G06T 5/002; G06T 2207/30201; G06T 2207/30208; G06T 7/55; G06T 7/62; G06T 7/50; G06T 7/97; G06T 2207/20076; G06T 7/285; G06T 2207/20004; G06T 2207/20192; G06T 2207/10004; G06T 11/00; G06T 2207/20024; G06T 2207/10148; G06T 7/77; G06T 7/344; G02B 25/007; G02B 23/16; G02B 13/22; G02B 27/0172; G02B 27/0025; G02B 26/0833; G02B 27/18; G02B 27/28; G02B 2027/0138; G02B 2027/014; G02B 27/0093; G02B 27/0176; G02B 27/0101; G02B 27/0081; G02B 30/40; G06F 18/00; G06F 3/011; G06F 3/1446; G06F 16/00; G06F 18/213; G06F 18/214; G06F 18/2321; G06F 18/253; G06F 30/27; G06F 3/0488; G06F 2203/04806; G06F 30/13; G06F 30/00; G06F 11/30; G06V 20/52; G06V 40/1359; G06V 10/245; G06V 10/25; G06V 10/82; G06V 20/695; G06V 10/40; G06V 10/7715; G06V 10/774; G06V 10/806; G06V 10/811; G06V 20/698; G06V 2201/06; G06V 20/58; G06V 20/647; G06V 20/20; G06V 40/168; G06V 10/74; G06V 10/44; G06V 20/64; G06V 10/764; G06V 40/172; G06V 40/19; G06V 40/197; G16H 40/67; G16H 50/20; G16H 50/30; G16H 40/63; G16H 50/50; G06Q 30/0643; G06Q 10/08; G06Q 10/20; G06Q 20/208; G06Q 10/00
See application file for complete search history.

(56) References Cited

U.S. PATENT DOCUMENTS

| | | | |
|---|---|---|---|
| 2010/0045701 A1* | 2/2010 | Scott | G06T 7/80 348/135 |
| 2017/0094255 A1* | 3/2017 | Zabatani | G06T 7/85 |
| 2017/0228864 A1* | 8/2017 | Liu | G06T 7/80 |
| 2017/0254636 A1* | 9/2017 | Foster | G01B 11/002 |
| 2019/0096091 A1* | 3/2019 | Bao | G06T 7/85 |
| 2019/0373185 A1 | 12/2019 | Kester et al. | |

OTHER PUBLICATIONS

"International Application Serial No. PCT US2022 050244, Written Opinion dated Apr. 11, 2023", 6 pgs.

Dorfmuller-Ulhaas, Klaus, "Optical Tracking From User Motion to 3D Interaction", Eurographics Association, (Dec. 2002), 182 pgs.

* cited by examiner $$\underset{i \in I, t}{\arg\min} f(i,t) := \{i \in I, t \mid \forall k \in I : f(k,t) \geq f(i,t)\} \quad (1)$$

$$f(i,t) := \sum_{\substack{(P,D) \in S \\ j \in \{1,2,...,n\}}} |P_{i,t}^j - D^j| \quad (2)$$

$$i := \theta(FocalLength, PrincipalPoints, RadialDistortion) \quad (3)$$

FIG. 13

CAMERA INTRINSIC RE-CALIBRATION IN MONO VISUAL TRACKING SYSTEM

TECHNICAL FIELD

The subject matter disclosed herein generally relates to a visual tracking system. Specifically, the present disclosure addresses systems and methods for calibrating cameras of a visual tracking system.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking systems that track a pose (e.g., orientation, position, location) of the device. A motion tracking system is typically factory calibrated (based on predefined/known relative positions between the cameras and other sensors) to accurately display the virtual content at a desired location relative to its environment. However, factory calibration parameters are based on factory conditions that are different from user operating conditions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 13 illustrates an example algorithm for detecting intrinsic calibration parameters in accordance with one example embodiment.

DETAILED DESCRIPTION

Figure 1:
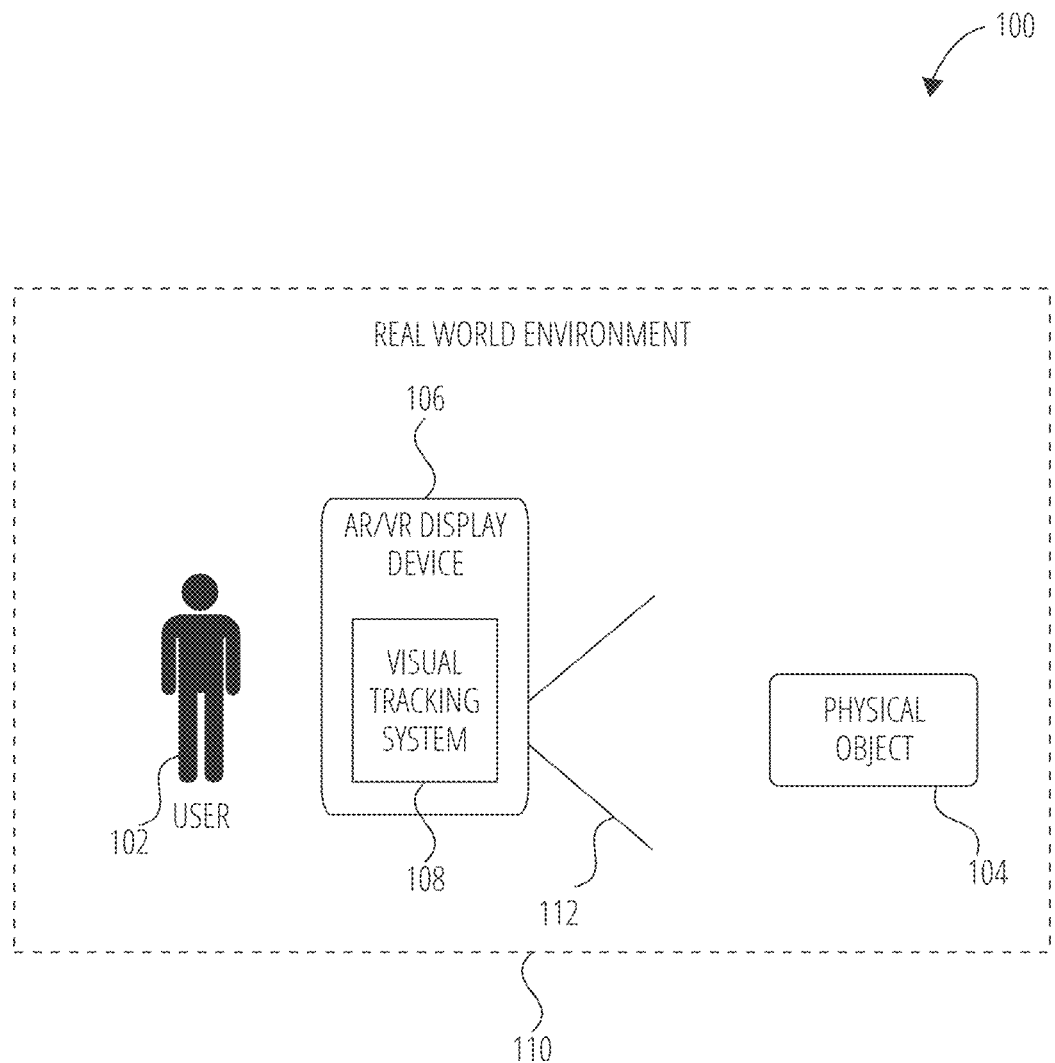
FIG. 1 is a block diagram illustrating an environment for operating a visual tracking system in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The "visual tracking system" is used herein to refer to a computer-operated application or system that enables a system to track visual features identified in images captured by one or more cameras of the visual tracking system, and build a model of a real-world environment based on the tracked visual features. Non-limiting examples of the visual tracking system include: a Visual Simultaneous Localization and Mapping system (VSLAM), and Visual-Inertial Simultaneous Localization and Mapping system (VI-SLAM). VSLAM can be used to build a target from an environment or a scene based on one or more cameras of the visual tracking system. VI-SLAM (also referred to as a visual-inertial tracking system) determines the latest position or pose of a device based on data acquired from multiple sensors (e.g., depth cameras, inertial sensors) of the device.

The term "intrinsic parameters" is used herein to refer to parameters that are based on conditions internal to the camera. Non-limiting examples of intrinsic parameters include: camera focal lengths, resolution, field of view, internal temperature of the camera, and internal measurement offset.

The term "extrinsic parameters" is used herein to refer to parameters that are based on conditions external to the camera. Non-limiting examples of extrinsic parameters include: ambient temperature (e.g., temperature of an environment in which the camera operates), and position and orientation of the camera relative to other sensors.

AR/VR applications enable a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to a physical object of interest. In order to do this, the AR display device detects the physical object and tracks a pose of the AR display device relative to a position of the physical object. A pose identifies a position and orientation of the display device relative to a frame of reference or relative to another object. For VR, the virtual object appears at a location (in the virtual environment) based on the pose of the VR display device. The virtual content is therefore refreshed based on a latest position of the device.

Cameras of the visual tracking system are subject to distortion, for example, due to heat generated by the cameras and other components connected or in proximity to the cameras. One example process is to calibrate optical cameras to obtain the distortion model (e.g., camera intrinsics). For AR/VR devices, calibration is a standard process to be carried on after manufacturing. This process is referred to as "factory calibration." Factory calibration is typically performed only once because the process is time consuming. For example, during factory calibration, the display device usually only runs the calibration program in a user environment that is often different from the factory calibration environment. In the factory calibration environment, only a few background applications operate at the display device, the display and processors in the display device are also consuming less power (and thus generate less heat). In the real-world environment, many background applications are running, the display and processor in the display device are also consuming much more power (and thus generate more heat).

The present application describes a method for identifying changes in camera distortion under various thermal conditions, and for generating a temperature-based distortion model (resulting in higher quality VSLAM). In other words, the present application describes an online camera distortion estimation method that produces a distortion model of a single camera of a display device at a given temperature condition. In one example, the visual tracking system instructs a user to perform a series of interactive operations to re-calibrate the intrinsic parameters of the single camera of the display device. Intrinsic changes in a heated camera are smaller in a central area of an image produced by the single camera than a border area of the image. The visual tracking system instructs the user to rotate/move his/her head (coupled to the head-wearable device that includes the visual tracking system) in a series of interactive operations to make the feature points in the central area of the camera lens visible in the border area of the camera lens. The detected/tracked feature points and the projected feature points using factory intrinsic parameters are misalign (and do not match) due to the thermal change in the camera.

The visual tracking system uses the single camera in a 6DOF (degrees of freedom) tracking to gather 3D information (e.g., features) about its environment. For example, the visual-inertial tracking system operates as a mono VI-SLAM system using the single camera. The visual-inertial tracking system identifies detected features (using the factory intrinsic parameters) that correspond to the projected features (using the VI tracking system). A tracking calibration module of the visual tracking system generates a temperature distortion model that identifies distortions based on the camera temperature, and the pairs of projected and detected features. The tracking calibration component can then determine intrinsic parameters of the single camera for a specific temperature based on the temperature distortion model. The visual-inertial tracking system adjusts and corrects the features detected by the single camera with the intrinsic parameters of the single camera operating at the specific temperature.

In one example embodiment, a method for calibrating a visual tracking system includes accessing a temperature of a camera of the visual tracking system, detecting that the temperature of the camera exceeds a threshold that is based on a factory calibration temperature of the camera, in response to detecting that the temperature of the camera exceeds the threshold, identifying one or more feature points that are located in a central region of an initial image generated by the camera, generating a graphical user interface element that instructs a user of the visual tracking system to move the visual tracking system towards a border region of the initial image, tracking, using the visual tracking system, one or more detected feature points in a border region of a second image generated by the camera, the border region of the second image corresponding to the central region of the initial image, calculating one or more projected feature points in the border region of the second image based on factory intrinsic calibration parameters of the visual tracking system, matching pairs of the one or more detected feature points in the border region of the second image with the corresponding one or more projected features points in the border region of the second image, and determining intrinsic parameters of the camera based on the matching pairs of the one or more detected feature points in the border region of the second image and the one or more projected feature points in the border region of the second image.

As a result, one or more of the methodologies described herein facilitate solving the technical problem of calibrating camera intrinsic parameters based on operating conditions that are different from factory conditions. The presently described method provides an improvement to an operation of the functioning of a computer by providing further accurate calibration computation to enhance a VI-SLAM pose estimation. Furthermore, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. The user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 includes a computing device having a display such as a smartphone, a tablet computer, or a wearable computing device (e.g., watch or glasses). The computing device may be hand-held or may be removable mounted to a head of the user 102. In one example, the display includes a screen that displays images captured with the cameras of the AR/VR display device 106. In another example, the display of the device may be transparent such as in lenses of wearable computing glasses. In other examples, the display may be non-transparent, partially transparent, or partially opaque. In yet other examples, the display may be wearable by the user 102 to completely or partially cover the field of vision of the user 102.

The AR/VR display device 106 includes an AR application (not shown) that causes a display of virtual content based on images detected with the cameras of the AR/VR display device 106. For example, the user 102 may point one or more cameras of the AR/VR display device 106 to capture an image of the physical object 104. The physical object 104 is within a field of view 112 of a camera (not shown) of the AR/VR display device 106. The AR application generates virtual content corresponding to an identified object (e.g., physical object 104) in the image and presents the virtual content in a display (not shown) of the AR/VR display device 106.

The AR/VR display device 106 includes a visual tracking system 108. The visual tracking system 108 tracks the pose (e.g., position and orientation) of the AR/VR display device 106 relative to the real world environment 110 using, for example, optical sensors (e.g., depth-enabled 3D camera, image camera), inertial sensors (e.g., gyroscope, accelerometer), magnetometer, wireless sensors (Bluetooth, Wi-Fi), GPS sensor, and audio sensor. In one example, the visual tracking system 108 includes a visual Simultaneous Localization and Mapping system (VSLAM) that operates with one or more cameras of the AR/VR display device 106. In one example, the AR/VR display device 106 displays virtual content based on the pose of the AR/VR display device 106 relative to the real world environment 110 and/or the physical object 104 (as determined by the visual tracking system 108). The visual tracking system 108 is described in more detail below with respect to FIG. 3.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 5 to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

In one example, the AR/VR display device 106 operates without communicating with a computer network. In another example, the AR/VR display device 106 communicates with the computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
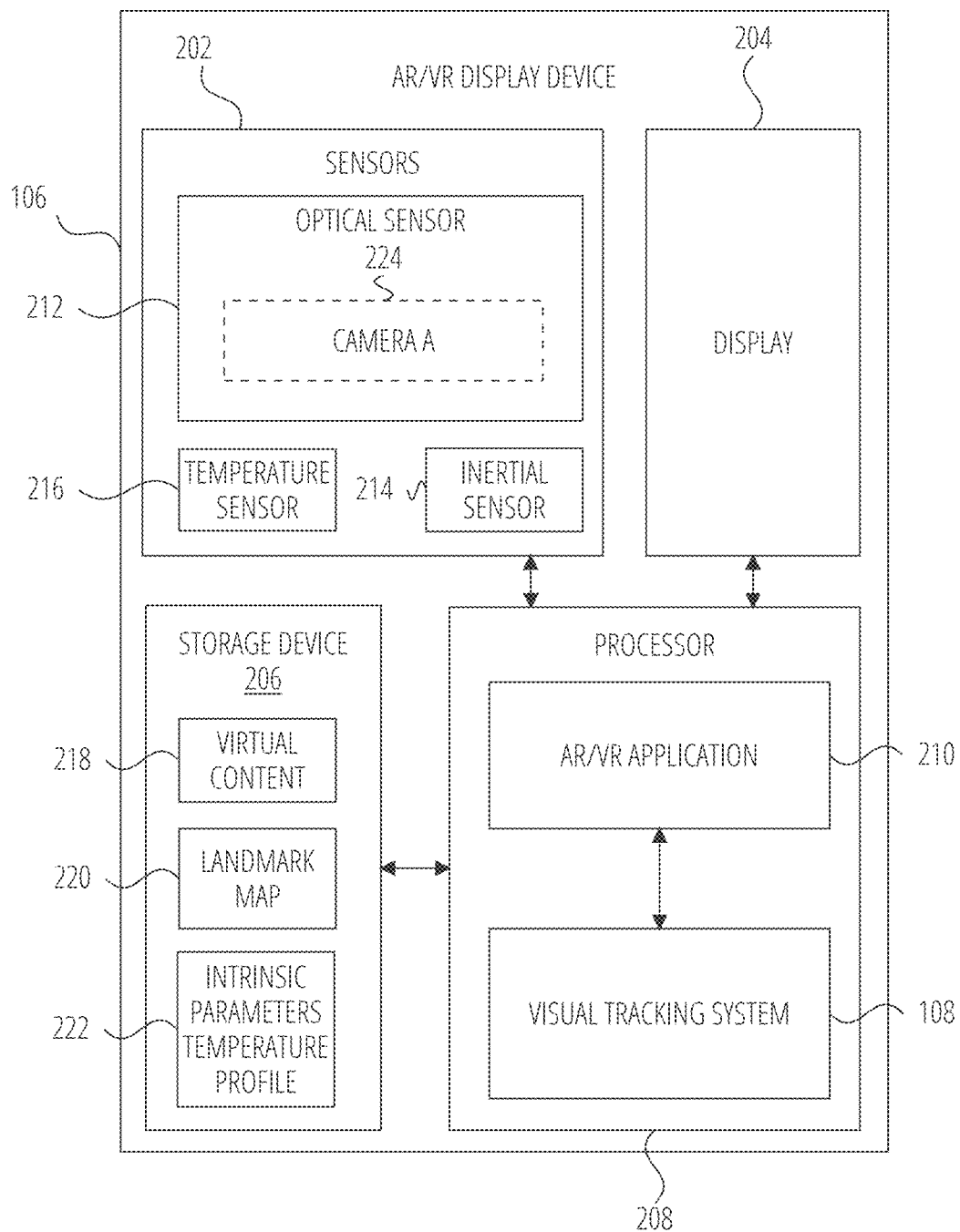
FIG. 2 is a block diagram illustrating a display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 208, and a storage device 206. Examples of AR/VR display device 106 include a wearable computing device, a mobile computing device (such as a smart phone or smart tablet), a navigational device, a portable media device.

The sensors 202 include, for example, optical sensor 212 (e.g., camera such as a color camera, a thermal camera, a depth sensor and one or multiple grayscale tracking cameras), an inertial sensor 214 (e.g., gyroscope, accelerometer, magnetometer), and temperature sensor 216. In one example, the optical sensor 212 includes a single camera (e.g., camera A 224). The temperature sensor 216 measures the temperature of the optical sensor 212, or a component that is attached or connected to the optical sensor 212. The temperature sensor 216 measures the temperature of the optical sensor 212. In one example, the temperature sensor 216 is disposed on a component of the AR/VR display device 106. In another example, the temperature sensor 216 is connected to the camera A 224. In yet another example, the first temperature sensor is disposed on a component adjacent to the camera A 224.

Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 208 includes an AR/VR application 210 and a visual tracking system 108. The AR/VR application 210 detects the physical object 104 using computer vision based on the detected features of the environment processed by the visual tracking system 108. The AR/VR application 210 retrieves virtual content (e.g., 3D object model) based on the identified physical object 104 or physical environment. The AR/VR application 210 renders the virtual object in the display 204. In one example embodiment, the AR/VR application 210 includes a local rendering engine that generates a visualization of virtual content overlaid (e.g., superimposed upon, or otherwise displayed in tandem with) on an image of the physical object 104 captured by the optical sensor 212. A visualization of the virtual content may be manipulated by adjusting a position of the physical object 104 (e.g., its physical location, orientation, or both) relative to the optical sensor 212. Similarly, the visualization of the virtual content may be manipulated by adjusting a pose of the AR/VR display device 106 relative to the physical object 104. For a VR application, the AR/VR application 210 displays the virtual content in an immersive virtual world displayed in the display 204 at a location (in the display 204) determined based on a pose of the AR/VR display device 106.

The visual tracking system 108 estimates a pose of the AR/VR display device 106. For example, the visual tracking system 108 uses image data and corresponding inertial data from the optical sensor 212 and the inertial sensor 214 to track a location and pose of the AR/VR display device 106 relative to a frame of reference (e.g., detected features in the real world environment 110). In one example embodiment, the visual tracking system 108 operates independently and asynchronously from the AR/VR application 210. For example, the visual tracking system 108 operates offline without receiving any tracking request from the AR/VR application 210. In another example, the visual tracking system 108 operates when the AR/VR application 210 is operating at the AR/VR display device 106. The visual tracking system 108 identifies camera intrinsics parameters of the optical sensor 212 and adjusts detected features in images based on the camera intrinsics parameters corresponding to a measured temperature of the optical sensor 212.

In one example embodiment, the visual tracking system 108 detects that the temperature of the camera A 224 exceeds a threshold that is based on factory calibration temperature of the camera A 224. For example, the threshold may be a preset threshold (e.g., 10 degrees). As such, the visual tracking system 108 triggers a calibration system when the temperature of the camera A 224 is 10 degrees higher than the factory calibration temperature. The visual tracking system 108 uses the camera A 224 in a 6DOF (degrees of freedom) tracking to gather 3D information (e.g., features) about its environment. In one example, the visual tracking system 108 operates as a mono VI-SLAM system relying only on camera A 224.

The visual tracking system 108 identifies detected features (using the factory intrinsic parameters) that correspond to the projected features (using a visual-inertial tracking system of the visual tracking system 108). The visual tracking system 108 generates a temperature distortion model that identifies distortions based on the camera temperature, and filtered pairs of projected and detected features points. The visual tracking system 108 can then determine intrinsic parameters of the camera A 224 for a specific temperature based on the temperature distortion model. The visual tracking system 108 adjusts and corrects the features detected by the camera A 224 with the intrinsic parameters of the camera A 224 operating at the specific temperature. Example components of the visual tracking system 108 is described in more detail below with respect to FIG. 3.

The storage device 206 stores virtual content 218, landmark map 220, and intrinsic parameters temperature profile 222. The virtual content 218 includes, for example, a database of visual references (e.g., images of physical objects) and corresponding experiences (e.g., two-dimensional or three-dimensional virtual object models). The landmark map 220 stores a map of an environment based on features detected by the visual tracking system 108. The intrinsic parameters temperature profile 222 include, for example, a temperature profile of the optical sensor 212 for the visual tracking system 108. In one example, the intrinsic parameters temperature profile 222 stores a temperature model that identifies camera intrinsic parameters for any temperature.

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
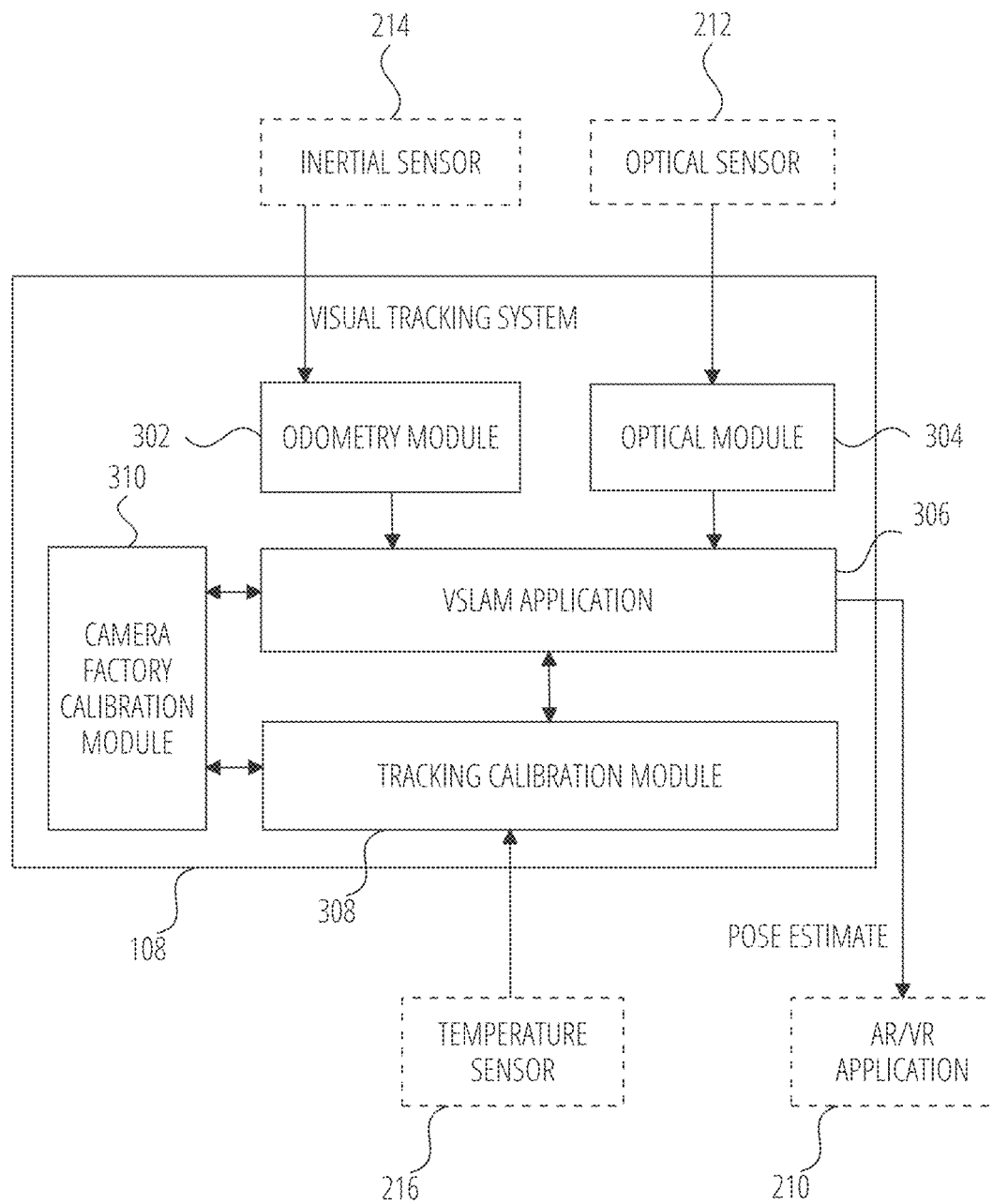
FIG. 3 is a block diagram illustrating a visual tracking system in accordance with one example embodiment.

FIG. 3 illustrates the visual tracking system 108 in accordance with one example embodiment. The visual tracking system 108 includes, for example, an odometry module 302, an optical module 304, a VSLAM application 306, a tracking calibration module 308, and a camera factory calibration module 310. The odometry module 302 accesses inertial sensor data from the inertial sensor 214. The optical module 304 accesses optical sensor data from the optical sensor 212. The tracking calibration module 308 accesses temperature data from the temperature sensor 216.

The VSLAM application 306 determines a pose (e.g., location, position, orientation) of the AR/VR display device 106 relative to a frame of reference (e.g., real world environment 110). In one example embodiment, the VSLAM application 306 includes a visual odometry system that estimates the pose of the AR/VR display device 106 based on 3D maps of feature points from images captured with the optical sensor 212 and the inertial sensor data captured with the inertial sensor 214. The VSLAM application 306 operates as a monocular VI-SLAM. The VSLAM application 306 provides the pose information to the AR/VR application 210 so that the AR/VR application 210 can render virtual content at display location that is based on the pose information.

A calibration process of the tracking calibration module 308 is triggered when the temperature of the camera A 224 (detected from temperature sensor 216) exceeds the threshold based on the factory calibration temperature. The tracking calibration module 308 identifies intrinsic parameters based on detected features from the camera A 224 (operating a higher temperature than the factory calibration temperature) and projected features from the camera A 224. The tracking calibration module 308 forms a temperature profile model based on pairs of projected and detected features and measured camera temperature. In one example, the tracking calibration module 308 accesses the camera intrinsic parameters from the camera factory calibration module 310 to identify the factory calibration temperature. The VSLAM application 306 adjusts or modifies the features detected by the one of the cameras based on the temperature profile model. The tracking calibration module 308 is described in more detail below with respect to FIG. 4.

Figure 4:
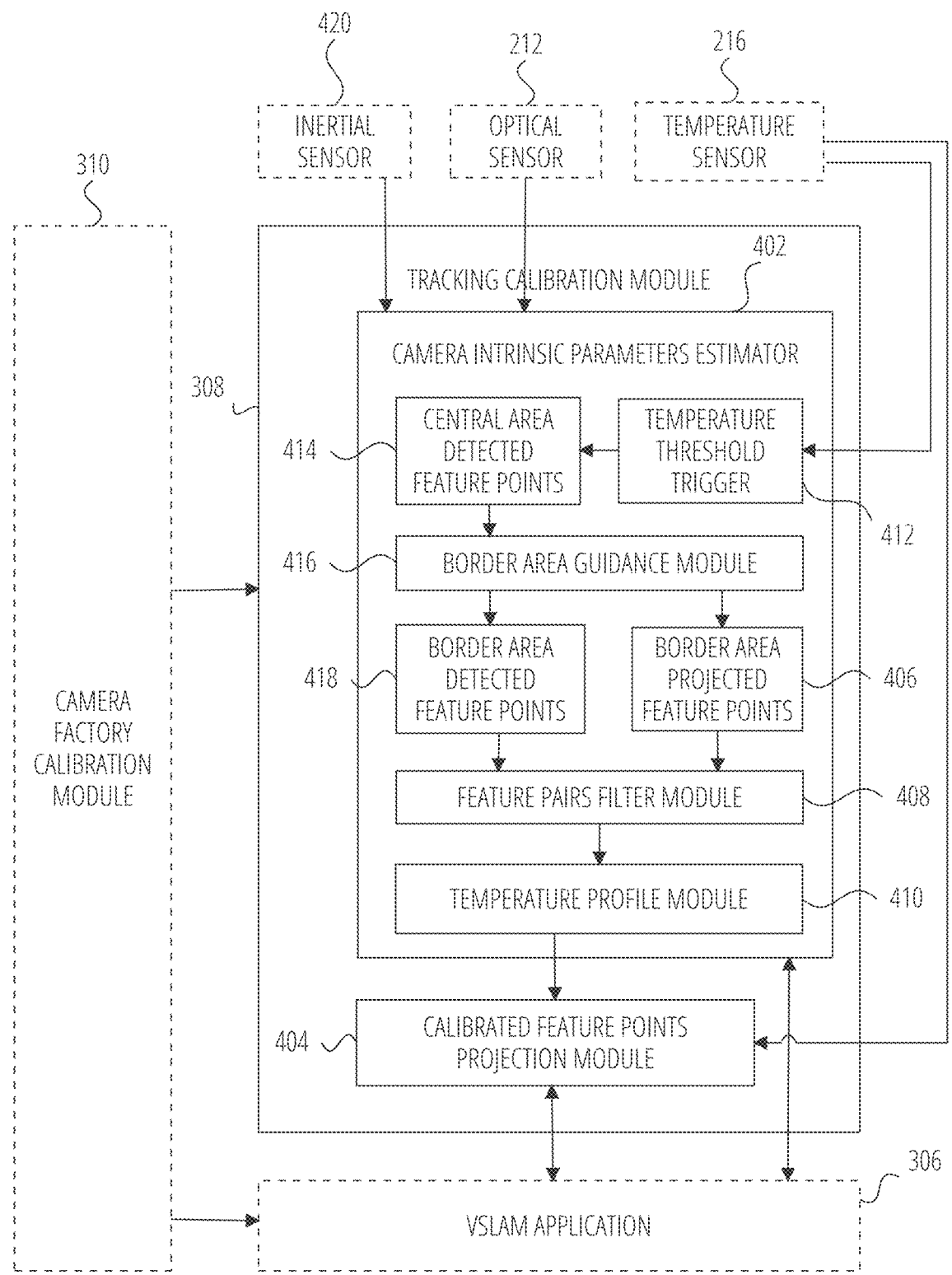
FIG. 4 is a block diagram illustrating a tracking calibration module in accordance with one example embodiment.

FIG. 4 is a block diagram illustrating a tracking calibration module 308 in accordance with one example embodiment. The tracking calibration module 308 includes a camera intrinsic parameters estimator 402, a calibrated feature points projection module 404, a border area projected feature points 406, a feature pairs filter module 408, a temperature profile module 410, a temperature threshold trigger 412, a central area detected feature points 414, a border area guidance module 416, a border area detected feature points 418, and an inertial sensor 420.

The temperature threshold trigger 412 accesses temperature data (in real-time) from the temperature sensor 216 and a preset threshold. When the temperature data indicates that the temperature of the camera A 224 exceeds a preset threshold above the factory calibration temperature of the camera A 224, the temperature threshold trigger 412 activates a calibration process starting with detecting central area detected feature points 414.

The camera intrinsic parameters estimator 402 determines central area detected feature points 414 corresponding to a 3D feature that is projected in a central area of an initial image generated by the optical sensor 212 and a camera pose Pc (using the odometry module 302). The central area includes an image area corresponding to a central region of the camera A 224. The central area may be based on a preset pixel range relative to the center of the image.

In another example, the camera intrinsic parameters estimator 402 analyzes feature points in an image generated by the camera A 224 and identifies robust features in the image. For example, the robust features may be based on a number of detected features within a preset sub-area. The camera intrinsic parameters estimator 402 guides the user to aim the camera A 224 at the robust features so that they are shown in the central area of the image. The tracking calibration module 308 uses the features to calculate corresponding 3D points.

The border area guidance module 416 guides the user to move the camera A 224 so that the 3D points are shown near a border area of the initial image. For example, the feature points that were initially projected in the central area of the initial image are now projected in a border area of the initial image (or a central area of a subsequent image generated by camera A 224). In one example, the border area guidance module 416 generates a graphical user interface element such as an arrow in the display 204 to guide the user to rotate the AR/VR display device 106. The arrow may point to a series of preset locations located in the border area. For example, the series of preset locations may be located throughout a periphery of the initial image. The size of the arrow may correspond to an amount of rotation of the AR/VR display device 106 so that the feature points (from the central area) are now located in the border area.

The camera intrinsic parameters estimator 402 determines the border area detected feature points 418 (e.g., feature points previously located in the central area of the initial image and now located in the border region of the initial image) based on the factory calibration intrinsic parameters of the camera A 224.

The camera intrinsic parameters estimator 402 determines the border area projected feature points 406 (e.g., feature points previously located in the central area of the initial image and now located in the border region of the initial image) using the pose of the AR/VR display device 106.

The feature pairs filter module 408 accesses the border area detected feature points 418 and the border area projected feature points 406 and forms feature pairs. In one example, the feature pairs filter module 408 filters out pairs of detected and projected features. In one example, the feature pairs filter module 408 removes outliers by (1) verifying that the changing direction between feature points is from center to borders (e.g., outward) in an image, (2) verifying that the pixels range or shift is within a preset range (e.g., from the center to edge, changing from 0 pixels to ~5 pixels), (3) finding the optical flow center which has the maximum number of inliers, and (4) verifying that the pixel shifting that is closer to the optical center is less than the pixels are located further away to the center.

The temperature profile module 410 forms a temperature distortion model that identifies distortions based on the camera temperature, and the pairs of projected and detected features. The visual tracking system 108 can then determine intrinsic parameters of the camera A 224 for a specific temperature based on the temperature distortion model. The visual tracking system 108 can adjust and correct the features detected by the camera A 224 with the intrinsic parameters of the camera A 224 that is operating at a specific temperature.

The calibrated feature points projection module 404 accesses the filtered pairs of projected and detected features from the feature pairs filter module 408 to identify camera intrinsics parameters based on a temperature of the optical sensor 212 (as detected by temperature sensor 216) and the temperature distortion model. Given the filtered projected/detected feature pairs, the temperature profile module 410 calculates new camera intrinsics parameters for any temperature. For any given temperature t, the temperature profile module 410 identifies the intrinsics i, which can be used to project 3D features on image at location P, and the sum distances between all the P and corresponding detected features at location D, where the sum is minimized. The equation shown in FIG. 13 illustrates the above-described algorithm performed at the calibrated feature points projection module 404.

Figure 5:
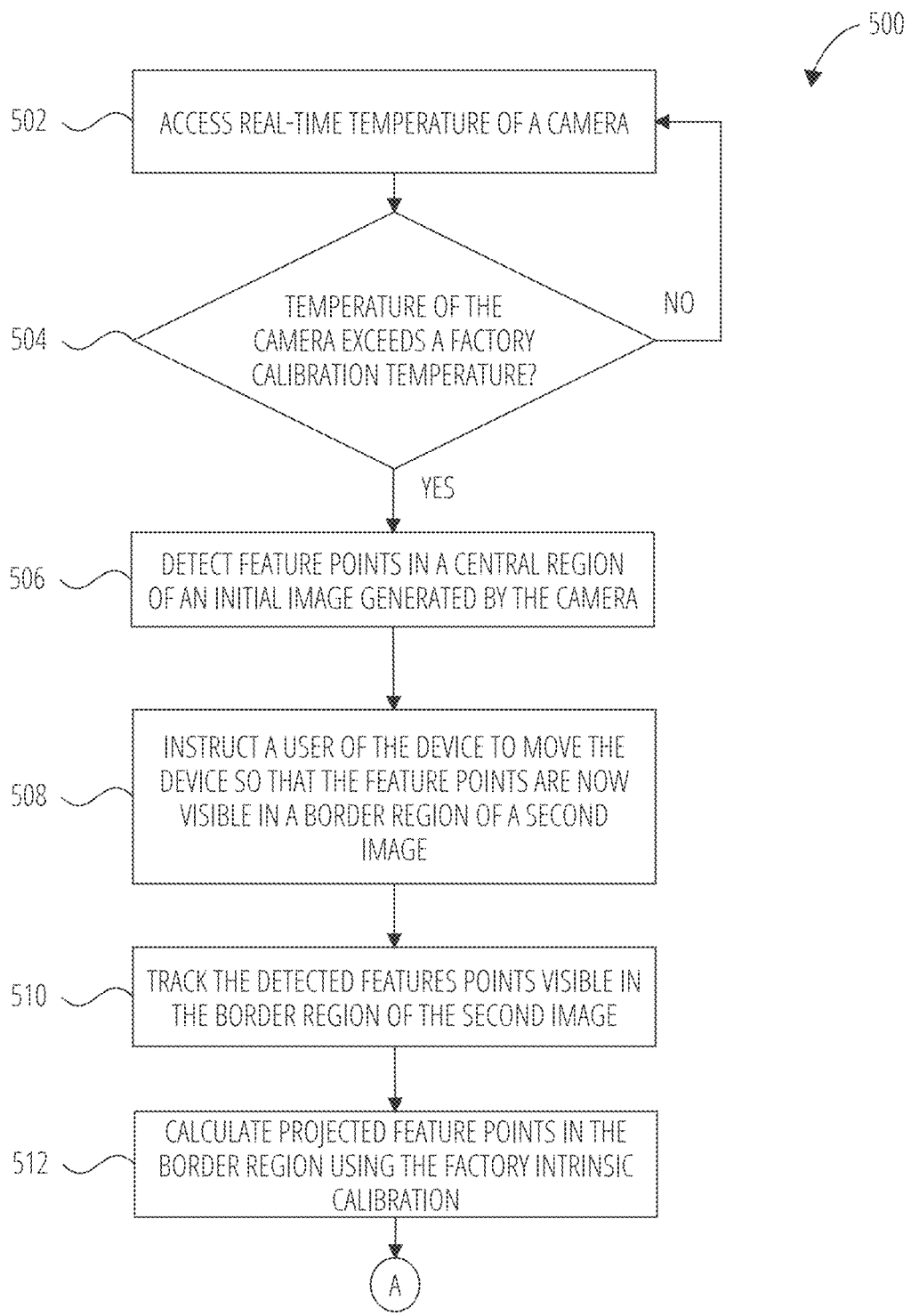
FIG. 5 is a flow diagram illustrating a method for projecting features in accordance with one example embodiment.

FIG. 5 is a flow diagram illustrating a method 500 for projecting features in accordance with one example embodiment. Operations in the method 500 may be performed by the tracking calibration module 308, using components (e.g., modules, engines) described above with respect to FIG. 4. Accordingly, the method 500 is described by way of example with reference to the tracking calibration module 308. However, it shall be appreciated that at least some of the operations of the method 500 may be deployed on various other hardware configurations or be performed by similar Components residing elsewhere.

In block 502, the temperature sensor 216 accesses real-time temperature of camera A 224. In decision block 504, the temperature threshold trigger 412 determines that the temperature of the camera A 224 exceeds a factory calibration temperature. In block 506, the central area detected feature points 414 detects feature points in a central region of an initial image generated by the camera A 224. In block 508, the border area guidance module 416 instructs a user of the AR/VR display device 106 to rotate the AR/VR display device 106 so that the feature points are now visible in a border region of a second image. In block 510, the border area detected feature points 418 tracks the detected features points visible in the border region of the second image. In block 512, the border area projected feature points 406 calculates projected feature points in the border region using the factory intrinsic calibration.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
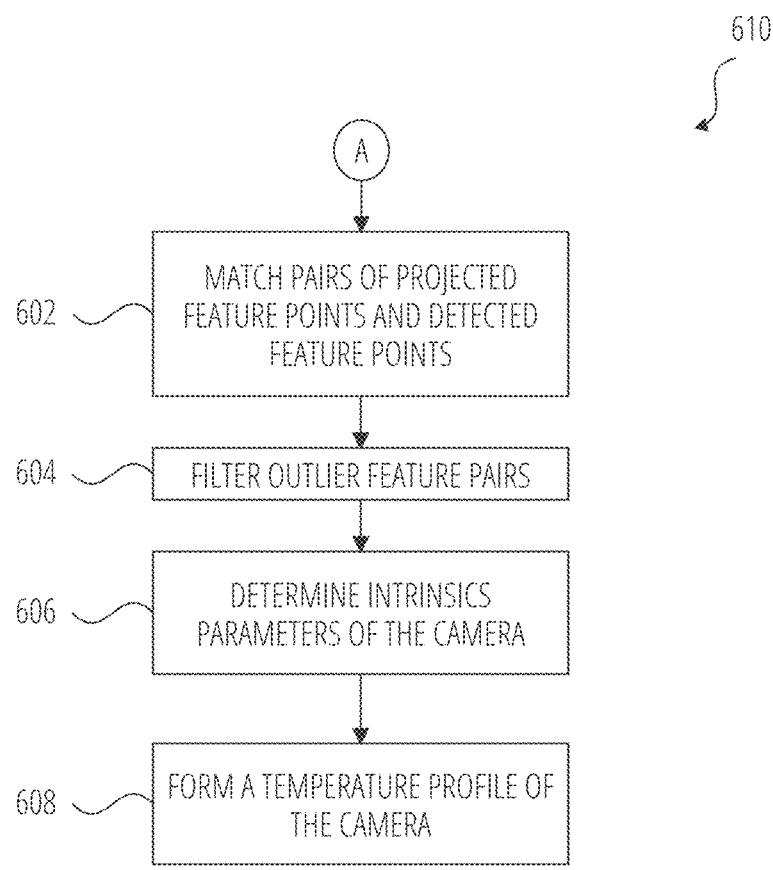
FIG. 6 is a flow diagram illustrating a method for forming a temperature profile in accordance with one example embodiment.

FIG. 6 is a flow diagram illustrating a method 610 for forming a temperature profile in accordance with one example embodiment. Operations in the method 610 may be performed by the tracking calibration module 308, using components (e.g., modules, engines) described above with respect to FIG. 4. Accordingly, the method 610 is described by way of example with reference to the tracking calibration module 308. However, it shall be appreciated that at least some of the operations of the method 610 may be deployed on various other hardware configurations or be performed by similar components residing elsewhere.

In block 602, the feature pairs filter module 408 matches pairs of projected feature points and detected feature points. In block 604, the feature pairs filter module 408 filters outlier feature pairs (based on the rules described above). In block 606, the temperature profile module 410 determines intrinsics parameters of the camera A 224. In block 608, the temperature profile module 410 forms a temperature profile of the camera A 224.

Figure 7:
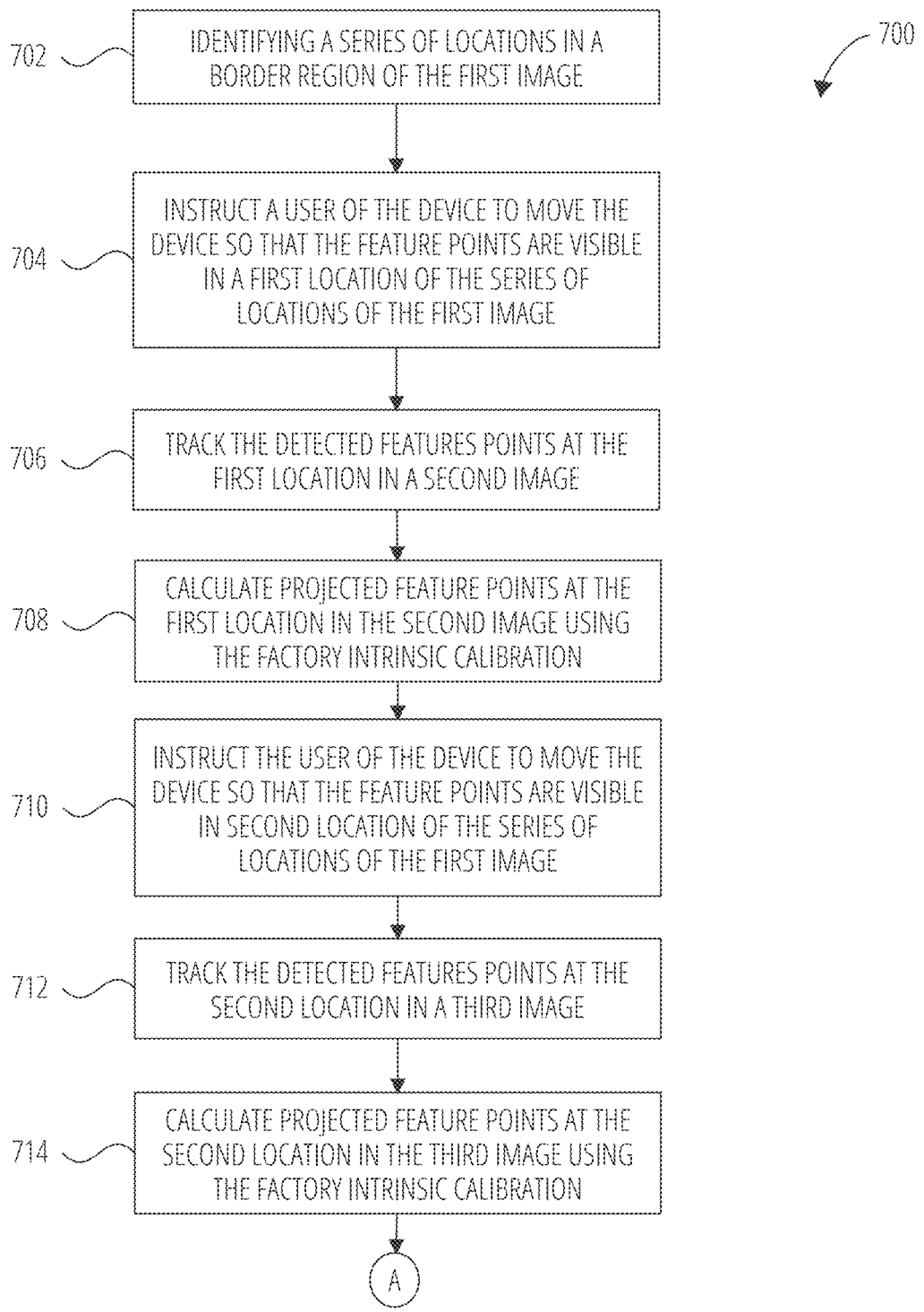
FIG. 7 is a flow diagram illustrating a method for projecting features in accordance with another example embodiment.

FIG. 7 is a flow diagram illustrating a method for projecting features in accordance with another example embodiment. Operations in the method 700 may be performed by the tracking calibration module 308, using components (e.g., modules, engines) described above with respect to FIG. 4. Accordingly, the method 700 is described by way of example with reference to the tracking calibration module 308. However, it shall be appreciated that at least some of the operations of the method 700 may be deployed on various other hardware configurations or be performed by similar Components residing elsewhere.

In block 702, the border area guidance module 416 identifying a series of locations in a border region of the first image. In block 704, the border area guidance module 416 instructs a user of the AR/VR display device 106 to move the AR/VR display device 106 so that the feature points are visible in a first location of the series of locations of the first image. In block 706, the border area detected feature points 418 tracks (based on the pose of the AR/VR display device 106) the detected features points at the first location in a second image. In block 708, the border area projected feature points 406 calculates projected feature points at the first location in the second image using the factory intrinsic calibration.

In block 710, the border area guidance module 416 instructs the user of the border area projected feature points 406 to move the border area projected feature points 406 so that the feature points are visible in second location of the series of locations of the first image. In block 712, the border area detected feature points 418 tracks the detected features points at the second location in a third image. In block 714, the border area projected feature points 406 calculates projected feature points at the second location in the third image using the factory intrinsic calibration.

Figure 8:
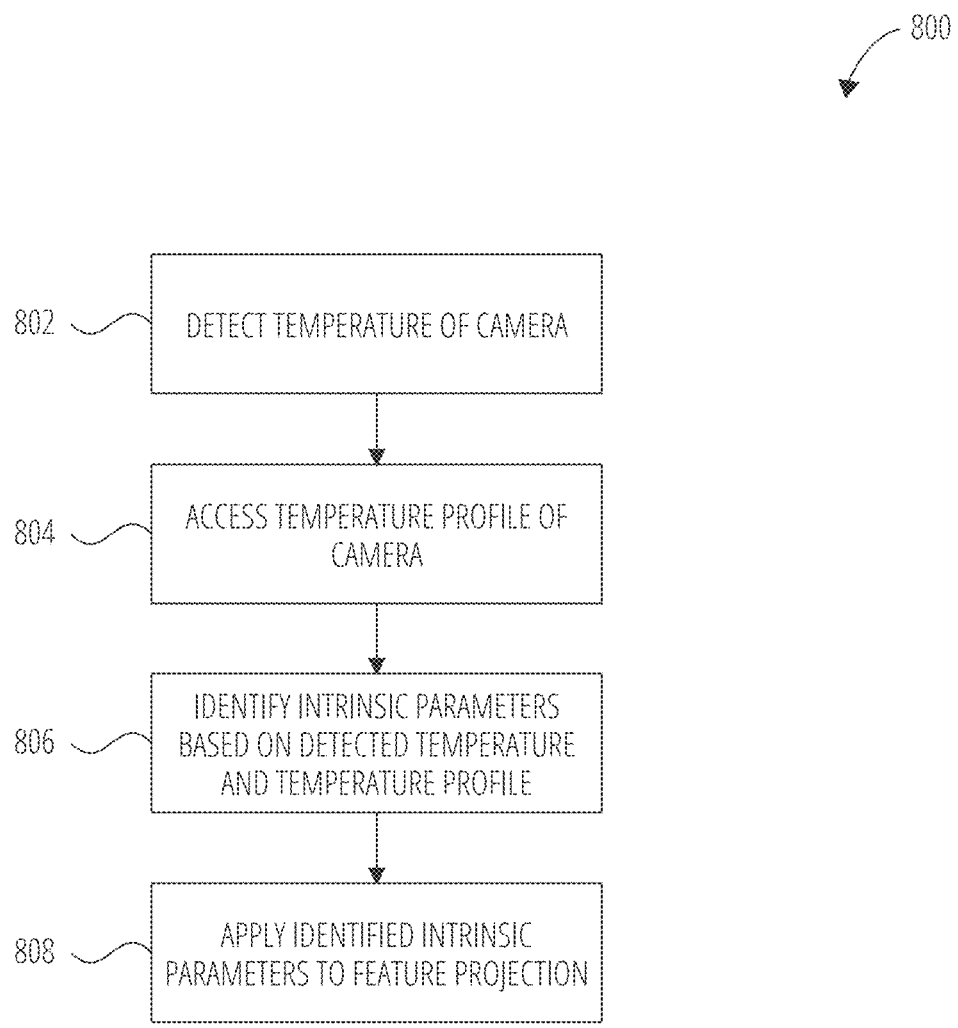
FIG. 8 is a flow diagram illustrating a method for identifying intrinsic parameters in accordance with one example embodiment.

FIG. 8 is a flow diagram illustrating a method for identifying intrinsic parameters in accordance with one example embodiment. Operations in the routine 800 may be performed by the tracking calibration module 308, using components (e.g., modules, engines) described above with respect to FIG. 4. Accordingly, the routine 800 is described by way of example with reference to the tracking calibration module 308. However, it shall be appreciated that at least some of the operations of the routine 800 may be deployed on various other hardware configurations or be performed by similar components residing elsewhere.

In block 802, the temperature sensor 216 detects the temperature of the camera A 224. In block 804, the temperature profile module 410 accesses a temperature profile of camera A 224. In block 806, the calibrated feature points projection module 404 identifies intrinsic parameters based on detected temperature and temperature profile. In block 808, the calibrated feature points projection module 404 applies identified intrinsic parameters to feature projection.

Figure 9:
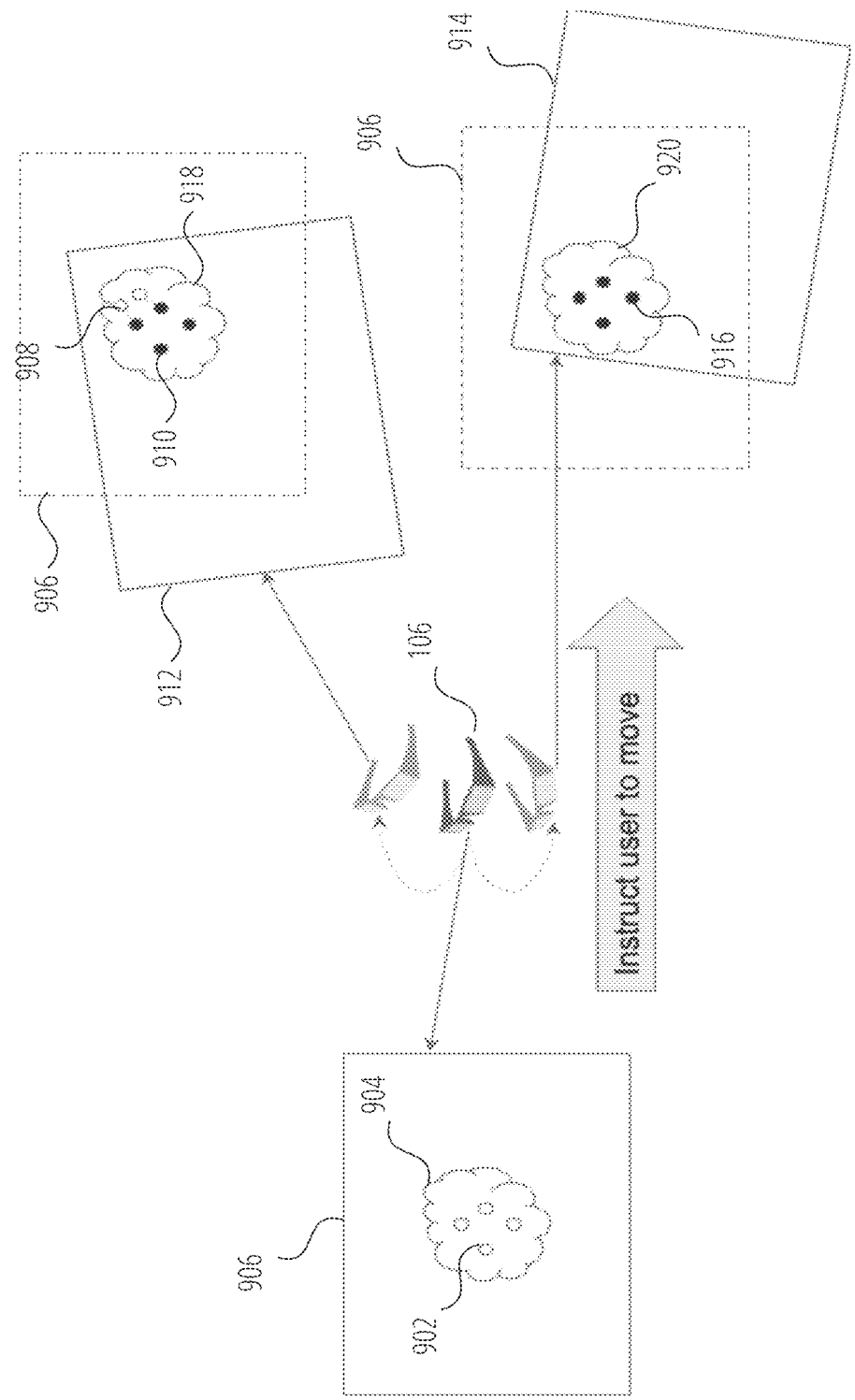
FIG. 9 is a block diagram illustrating a calibration process in accordance with one example embodiment.

FIG. 9 is a block diagram illustrating a calibration process in accordance with one example embodiment. The AR/VR display device 106 detects detected feature point 902 located in a central region 904 of the first image 906. The user 102 is instructed to move or rotate the AR/VR display device 106. The AR/VR display device 106 generates a second image 912 where the projected feature point 910 and the detected feature point 908 are located in a border region 918 of the second image 912. Similarly, the AR/VR display device 106 generates a third image 914 where the detected feature point 916 is located in a border region 920.

Figure 10:
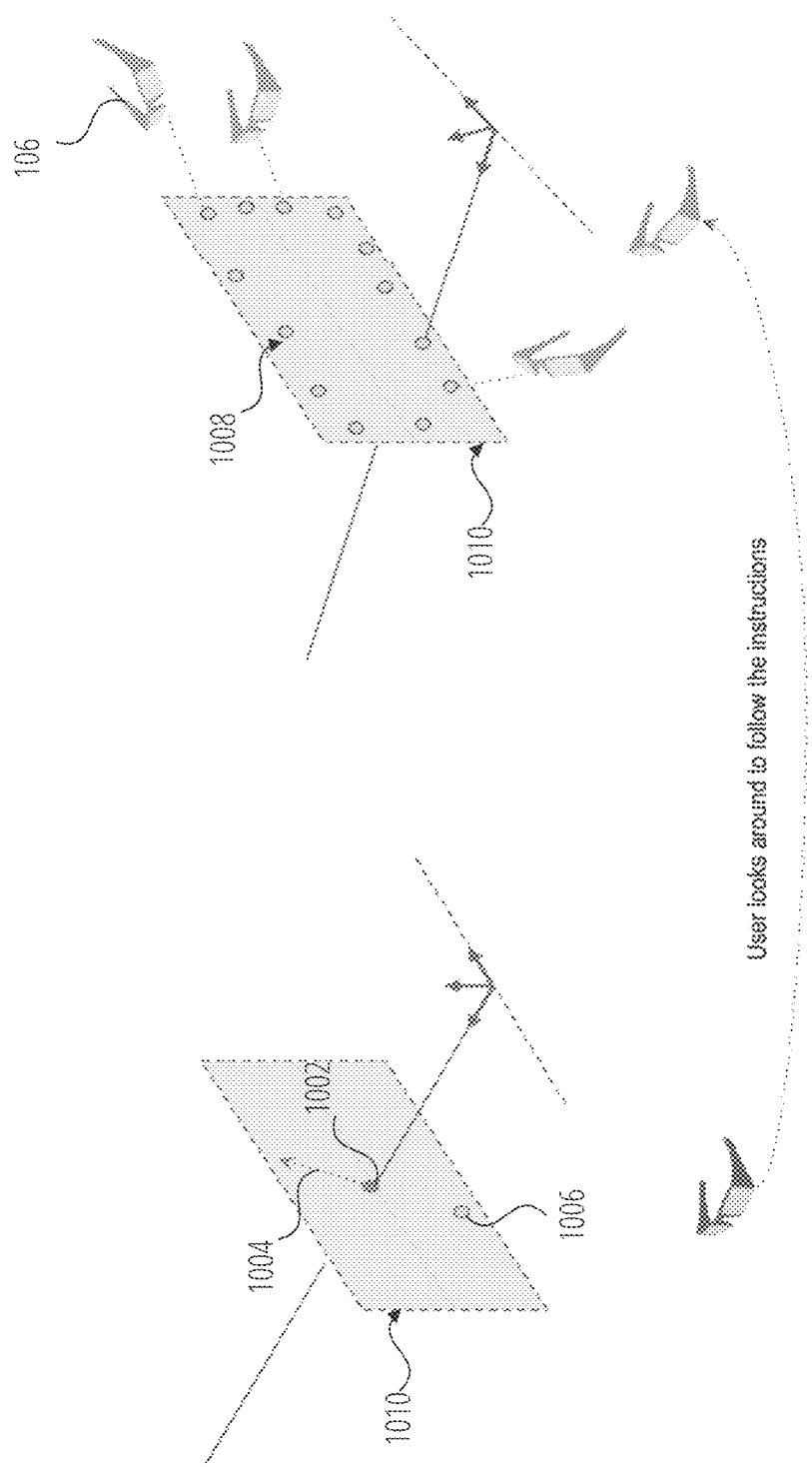
FIG. 10 is a block diagram illustrating a peripheral region calibration process in accordance with one example embodiment.

FIG. 10 is a block diagram illustrating a peripheral region calibration process in accordance with one example embodiment. An instructions GUI element 1004 is displayed to indicate a requested movement direction of the AR/VR display device 106. The features 1002 is shown in a central area of the image 1010. The instructions GUI element 1004 indicates a movement direction so these features would appear near the border area of the image 1010 and/or target place (e.g., target location 1006).

The instructions GUI element 1004 guides the user to aim the AR/VR display device 106 so that the features 1002 appear at a series of different location in the peripheral region 1008 of the image 1010.

Figure 11:
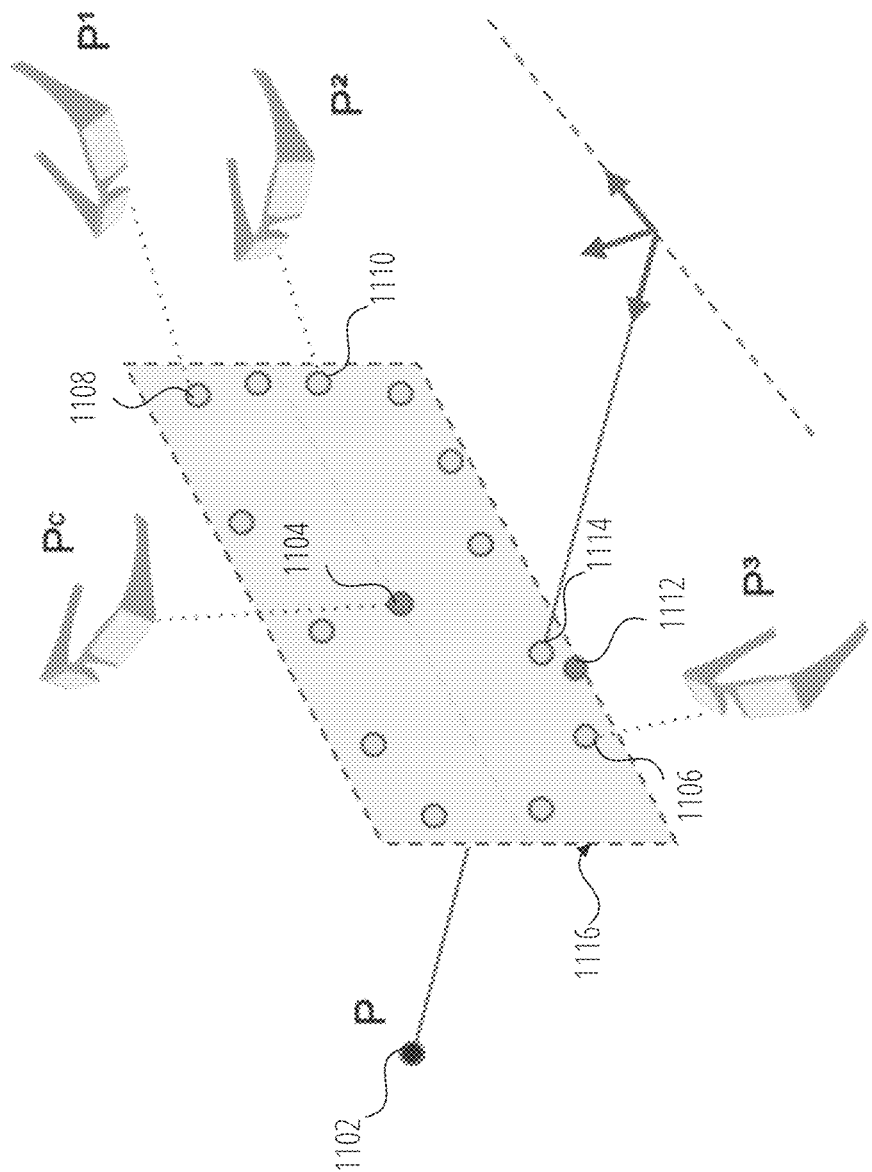
FIG. 11 is a block diagram illustrating detected and projected feature points in a peripheral region in accordance with one example embodiment.

FIG. 11 is a block diagram illustrating detected and projected feature points in a peripheral region in accordance with one example embodiment. For every 3D feature f (e.g., 3D feature point 1102), when the feature is projected in the central area (feature point 1104) of image 1116, the VSLAM application 306 detects a corresponding camera pose (e.g., Pc). When the user is moving/looking around, the feature points P (3D feature point 1102) are projected at the border areas (e.g., projected feature point 1108, projected feature point 1110, and projected feature point 1106) with corresponding camera poses are P1, P2, P3 . . . .

Figure 12:
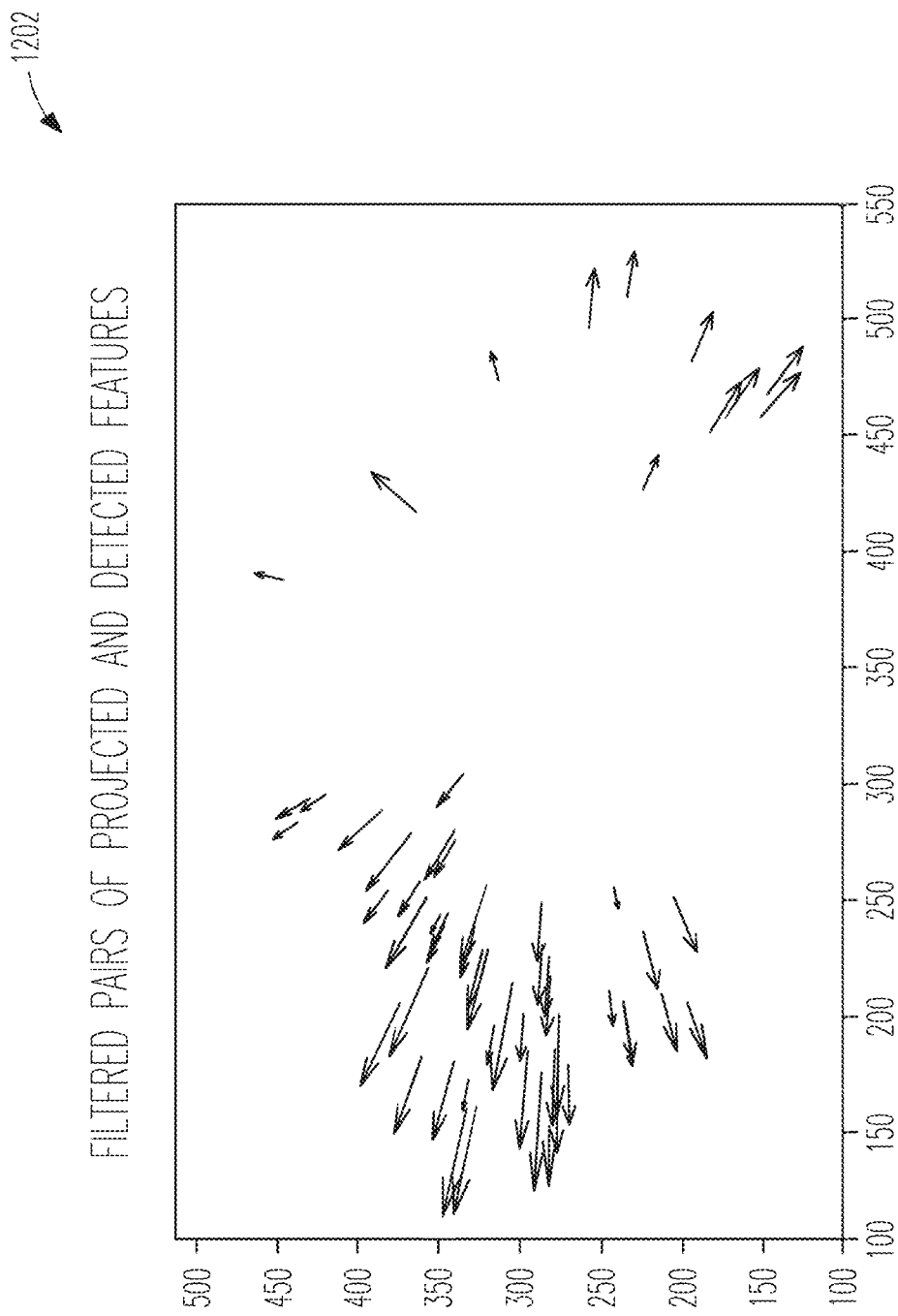
FIG. 12 is a graph illustrating pairs of projected and detected feature points in accordance with one example embodiment.

Distortion caused by temperature change is minor in the middle area of the image 1116. However, distortion causes by temperature change increases at the border areas of the image 1116. The tracking calibration module 308 uses factory calibration to project 3D points on 2D image plane in the border areas. Due to the distortion caused by temperature change, the projection (e.g., projected feature point 1114, 3D to 2D with factory calibration) and feature detected in the image by SLAM (e.g., detected feature point 1112, detect corner or harris features, ORB features, etc.) have offsets that can go up to 4-5 pixels on full HD (2k) resolution image FIG. 12 illustrates a graph depicting filtered pairs of projected and detected features 1202 in accordance with one example embodiment.

FIG. 13 illustrates an example algorithm for detecting intrinsic calibration parameters in accordance with one example embodiment. Given enough feature pairs, the temperature profile module 410 calculates new camera intrinsics parameters for current (higher) temperature. For any given temperature t, the temperature profile module 410 finds the intrinsics i, which can be used to project 3D features on image at location P, and the sum distances between all the P and corresponding detected features at location D, where the sum is minimized.

System with Head-Wearable Apparatus

Figure 14:
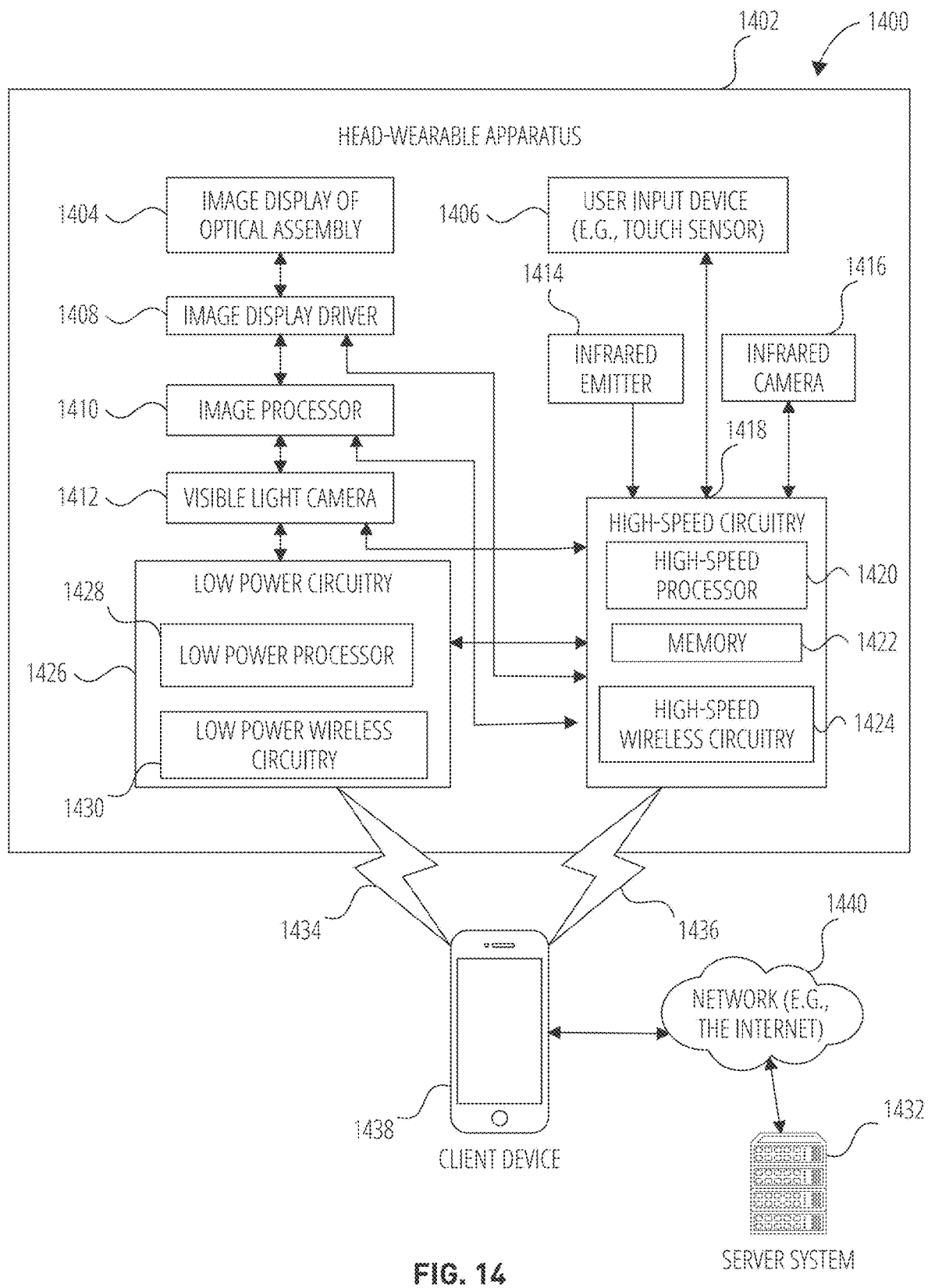
FIG. 14 illustrates a network environment in which a head-wearable device can be implemented according to one example embodiment.

FIG. 14 illustrates a network environment 1400 in which the head-wearable apparatus 1402 can be implemented according to one example embodiment. FIG. 14 is a high-level functional block diagram of an example head-wearable apparatus 1402 communicatively coupled a mobile client device 1438 and a server system 1432 via various network 1440.

head-wearable apparatus 1402 includes a camera, such as at least one of visible light camera 1412, infrared emitter 1414 and infrared camera 1416. The client device 1438 can be capable of connecting with head-wearable apparatus 1402 using both a communication 1434 and a communication 1436. client device 1438 is connected to server system 1432 and network 1440. The network 1440 may include any combination of wired and wireless connections.

The head-wearable apparatus 1402 further includes two image displays of the image display of optical assembly 1404. The two include one associated with the left lateral side and one associated with the right lateral side of the head-wearable apparatus 1402. The head-wearable apparatus 1402 also includes image display driver 1408, image processor 1410, low-power low power circuitry 1426, and high-speed circuitry 1418. The image display of optical assembly 1404 are for presenting images and videos, including an image that can include a graphical user interface to a user of the head-wearable apparatus 1402.

The image display driver 1408 commands and controls the image display of the image display of optical assembly 1404. The image display driver 1408 may deliver image data directly to the image display of the image display of optical assembly 1404 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1402 includes a frame and stems (or temples) extending from a lateral side of the frame. The head-wearable apparatus 1402 further includes a user input device 1406 (e.g., touch sensor or push button) including an input surface on the head-wearable apparatus 1402. The user input device 1406 (e.g., touch sensor or push button) is to receive from the user an input selection to manipulate the graphical user interface of the presented image.

The components shown in FIG. 14 for the head-wearable apparatus 1402 are located on one or more circuit boards, for example a PCB or flexible PCB, in the rims or temples. Alternatively, or additionally, the depicted components can be located in the chunks, frames, hinges, or bridge of the head-wearable apparatus 1402. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1402 includes a memory 1422 which stores instructions to perform a subset or all of the functions described herein. memory 1422 can also include storage device.

As shown in FIG. 14, high-speed circuitry 1418 includes high-speed processor 1420, memory 1422, and high-speed wireless circuitry 1424. In the example, the image display driver 1408 is coupled to the high-speed circuitry 1418 and operated by the high-speed processor 1420 in order to drive the left and right image displays of the image display of optical assembly 1404. high-speed processor 1420 may be any processor capable of managing high-speed communications and operation of any general computing system needed for head-wearable apparatus 1402. The high-speed processor 1420 includes processing resources needed for managing high-speed data transfers on communication 1436 to a wireless local area network (WLAN) using high-speed wireless circuitry 1424. In certain examples, the high-speed processor 1420 executes an operating system such as a LINUX operating system or other such operating system of the head-wearable apparatus 1402 and the operating system is stored in memory 1422 for execution. In addition to any other responsibilities, the high-speed processor 1420 executing a software architecture for the head-wearable apparatus 1402 is used to manage data transfers with high-speed wireless circuitry 1424. In certain examples, high-speed wireless circuitry 1424 is configured to implement Institute of Electrical and Electronic Engineers (IEEE) 1402.11 communication standards, also referred to herein as Wi-Fi. In other examples, other high-speed communications standards may be implemented by high-speed wireless circuitry 1424.

The low power wireless circuitry 1430 and the high-speed wireless circuitry 1424 of the head-wearable apparatus 1402 can include short range transceivers (Bluetooth™) and wireless wide, local, or wide area network transceivers (e.g., cellular or WiFi). The client device 1438, including the transceivers communicating via the communication 1434 and communication 1436, may be implemented using details of the architecture of the head-wearable apparatus 1402, as can other elements of network 1440.

The memory 1422 includes any storage device capable of storing various data and applications, including, among other things, camera data generated by the left and right, infrared camera 1416, and the image processor 1410, as well as images generated for display by the image display driver 1408 on the image displays of the image display of optical assembly 1404. While memory 1422 is shown as integrated with high-speed circuitry 1418, in other examples, memory 1422 may be an independent standalone element of the head-wearable apparatus 1402. In certain such examples, electrical routing lines may provide a connection through a chip that includes the high-speed processor 1420 from the image processor 1410 or low power processor 1428 to the memory 1422. In other examples, the high-speed processor 1420 may manage addressing of memory 1422 such that the low power processor 1428 will boot the high-speed processor 1420 any time that a read or write operation involving memory 1422 is needed.

As shown in FIG. 14, the low power processor 1428 or high-speed processor 1420 of the head-wearable apparatus 1402 can be coupled to the camera (visible light camera 1412; infrared emitter 1414, or infrared camera 1416), the image display driver 1408, the user input device 1406 (e.g., touch sensor or push button), and the memory 1422.

The head-wearable apparatus 1402 is connected with a host computer. For example, the head-wearable apparatus 1402 is paired with the client device 1438 via the communication 1436 or connected to the server system 1432 via the network 1440. server system 1432 may be one or more computing devices as part of a service or network computing system, for example, that include a processor, a memory, and network communication interface to communicate over the network 1440 with the client device 1438 and head-wearable apparatus 1402.

The client device 1438 includes a processor and a network communication interface coupled to the processor. The network communication interface allows for communication over the network 1440, communication 1434 or communication 1436. client device 1438 can further store at least portions of the instructions for generating a binaural audio content in the client device 1438's memory to implement the functionality described herein.

Output components of the head-wearable apparatus 1402 include visual components, such as a display such as a liquid crystal display (LCD), a plasma display panel (PDP), a light emitting diode (LED) display, a projector, or a waveguide. The image displays of the optical assembly are driven by the image display driver 1408. The output components of the head-wearable apparatus 1402 further include acoustic components (e.g., speakers), haptic components (e.g., a vibratory motor), other signal generators, and so forth. The input components of the head-wearable apparatus 1402, the client device 1438, and server system 1432, such as the user input device 1406, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1402 may optionally include additional peripheral device elements. Such peripheral device elements may include biometric sensors, additional sensors, or display elements integrated with head-wearable apparatus 1402. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1436 from the client device 1438 via the low power wireless circuitry 1430 or high-speed wireless circuitry 1424.

Figure 15:
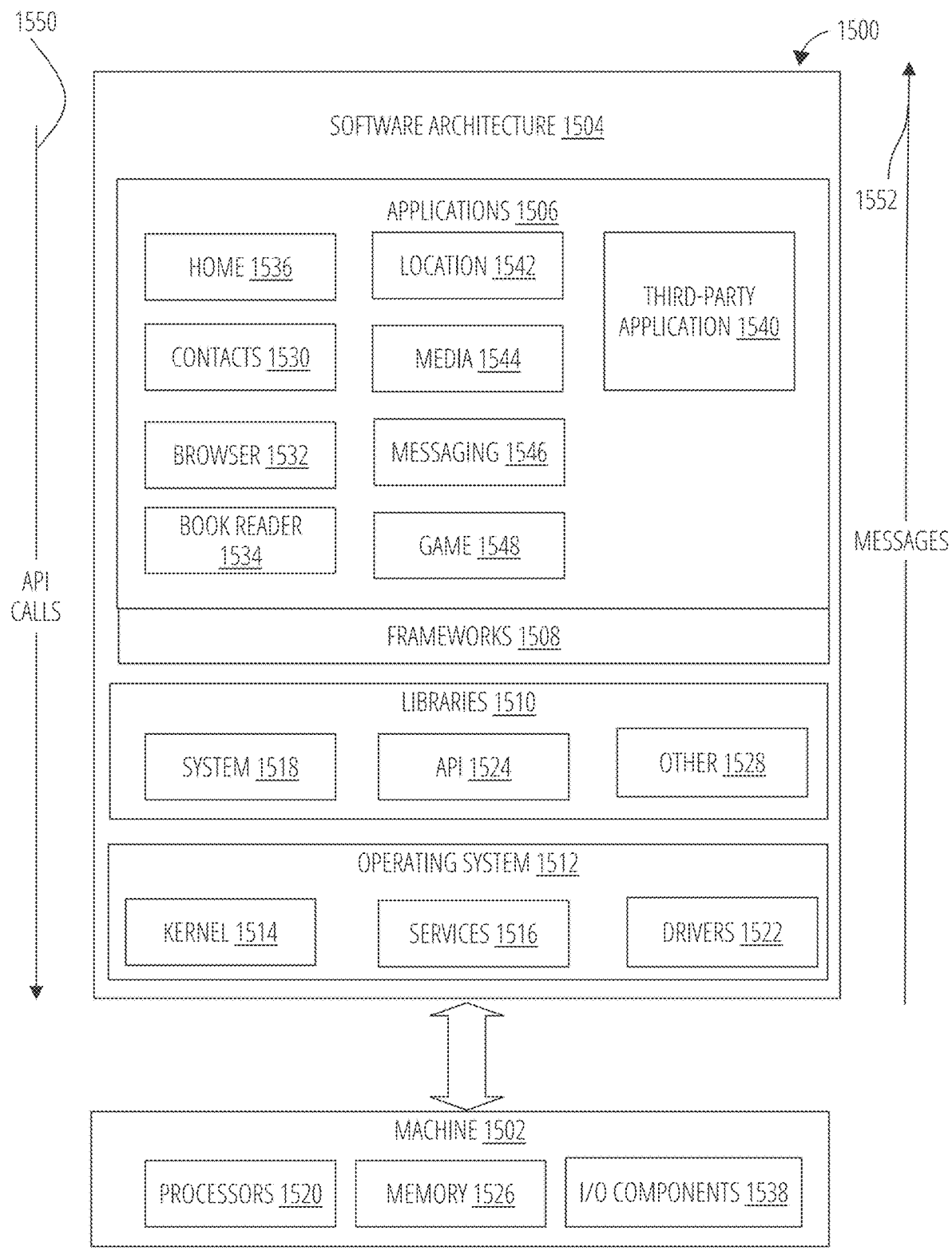
FIG. 15 is a block diagram showing a software architecture within which the present disclosure may be implemented, according to an example embodiment.

FIG. 15 is block diagram 1500 showing a software architecture within which the present disclosure may be implemented, according to an example embodiment. The software architecture 1504 is supported by hardware such as a machine 1502 that includes Processors 1520, memory 1526, and I/O Components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, Processor management (e.g., scheduling), Component management, networking, and security settings, among other functionalities. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a high-level common infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example embodiment, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs.

Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Figure 16:
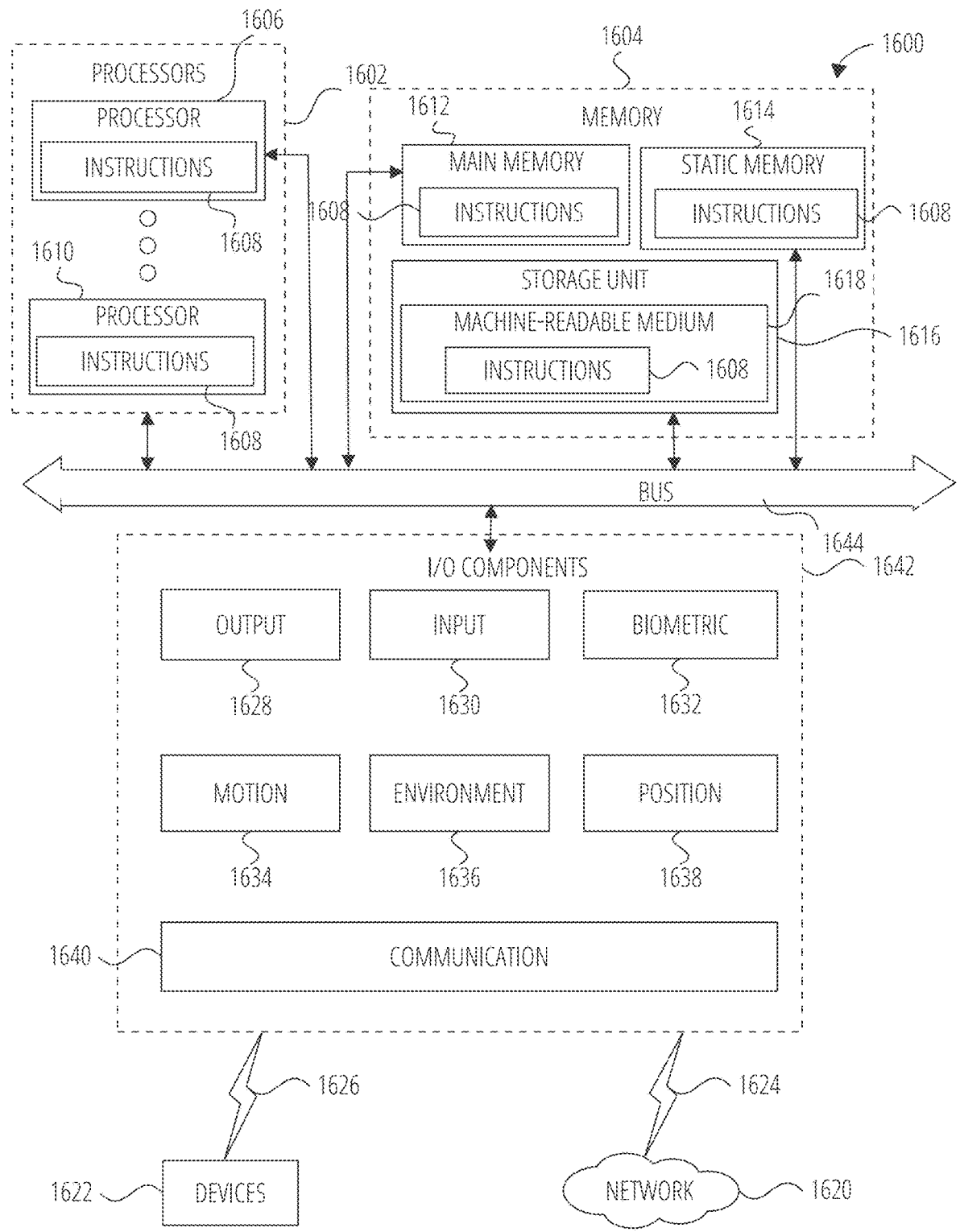
FIG. 16 is a diagrammatic representation of a machine in the form of a computer system within which a set of instructions may be executed for causing the machine to perform any one or more of the methodologies discussed herein, according to one example embodiment.

FIG. 16 is a diagrammatic representation of the machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein.

The machine 1600 may include Processors 1602, memory 1604, and I/O Components 1642, which may be configured to communicate with each other via a bus 1644. In an example embodiment, the Processors 1602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1606 and a Processor 1610 that execute the instructions 1608. The term "Processor" is intended to include multi-core Processors that may comprise two or more independent Processors (sometimes referred to as "cores") that may execute instructions contemporaneously. Although FIG. 16 shows multiple Processors 1602, the machine 1600 may include a single Processor with a single core, a single Processor with multiple cores (e.g., a multi-core Processor), multiple Processors with a single core, multiple Processors with multiples cores, or any combination thereof.

The memory 1604 includes a main memory 1612, a static memory 1614, and a storage unit 1616, both accessible to the Processors 1602 via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the Processors 1602 (e.g., within the Processor's cache memory), or any suitable combination thereof, during execution thereof by the machine 1600.

The I/O Components 1642 may include a wide variety of Components to receive input, provide output, produce output, transmit information, exchange information, capture measurements, and so on. The specific I/O Components 1642 that are included in a particular machine will depend on the type of machine. For example, portable machines such as mobile phones may include a touch input device or other such input mechanisms, while a headless server machine will likely not include such a touch input device. It will be appreciated that the I/O Components 1642 may include many other Components that are not shown in FIG. 16. In various example embodiments, the I/O Components 1642 may include output Components 1628 and input Components 1630. The output Components 1628 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1630 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1642 may include biometric Components 1632, motion Components 1634, environmental Components 1636, or position Components 1638, among a wide array of other Components. For example, the biometric Components 1632 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1634 include acceleration sensor Components (e.g., accelerometer), gravitation sensor Components, rotation sensor Components (e.g., gyroscope), and so forth. The environmental Components 1636 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1638 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1642 further include communication Components 1640 operable to couple the machine 1600 to a network 1620 or devices 1622 via a coupling 1624 and a coupling 1626, respectively. For example, the communication Components 1640 may include a network interface Component or another suitable device to interface with the network 1620. In further examples, the communication Components 1640 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1622 may be another machine or any of a wide variety of peripheral devices (e.g., a peripheral device coupled via a USB).

Moreover, the communication Components 1640 may detect identifiers or include Components operable to detect identifiers. For example, the communication Components 1640 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1640, such as location via Internet Protocol (QP) geolocation, location via Wi-Fi® signal triangulation, location via detecting an NFC beacon signal that may indicate a particular location, and so forth.

The various memories (e.g., memory 1604, main memory 1612, static memory 1614, and/or memory of the Processors 1602) and/or storage unit 1616 may store one or more sets of instructions and data structures (e.g., software) embodying or used by any one or more of the methodologies or functions described herein. These instructions (e.g., the instructions 1608), when executed by Processors 1602, cause various operations to implement the disclosed embodiments.

The instructions 1608 may be transmitted or received over the network 1620, using a transmission medium, via a network interface device (e.g., a network interface Component included in the communication Components 1640) and using any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method for calibrating a visual tracking system comprising: accessing a temperature of a camera of the visual tracking system; detecting that the temperature of the camera exceeds a threshold that is based on a factory calibration temperature of the camera; in response to detecting that the temperature of the camera exceeds the threshold, identifying one or more feature points that are located in a central region of an initial image generated by the camera; generating a graphical user interface element that instructs a user of the visual tracking system to move the visual tracking system towards a border region of the initial image; tracking, using the visual tracking system, one or more detected feature points in a border region of a second image generated by the camera, the border region of the second image corresponding to the central region of the initial image; calculating one or more projected feature points in the border region of the second image based on factory intrinsic calibration parameters of the visual tracking system; matching pairs of the one or more detected feature points in the border region of the second image with the corresponding one or more projected features points in the border region of the second image; and determining intrinsic parameters of the camera based on the matching pairs of the one or more detected feature points in the border region of the second image and the one or more projected feature points in the border region of the second image.

Example 2 includes the method of example 1, further comprising: displaying the graphical user interface element in a display of the visual tracking system, the graphical user interface element comprising a vector that indicates a direction and a magnitude of displacement of the visual tracking system, wherein the direction points to the border region of the initial image, wherein the magnitude of displacement is based on an angular rotation between the central region of the initial image and the border region of the initial image.

Example 3 includes the method of example 1, further comprising: in response to detecting that the temperature of the camera exceeds the threshold, identifying a number of feature points corresponding to a 3D location exceeds a feature point threshold; and guiding the user to direct the visual tracking system so that the 3D location is located in the central region of the initial image.

Example 4 includes the method of example 1 1, further comprising: identifying a plurality of locations in the border region of the initial image, the plurality of locations being dispersed throughout a perimeter of the initial image; directing the graphical user interface element to sequentially move the visual tracking system so that the one or more detected featured points are sequentially visible at each of the plurality of locations; tracking, using the visual tracking system, the one or more detected feature points at each of the plurality of locations and a corresponding pose of the visual tracking system at each of the plurality of locations; calculating one or more projected feature points at each of the plurality of locations using factory intrinsic calibration parameters of the visual tracking system; matching pairs of the one or more detected feature points at each of the plurality of locations with the corresponding one or more projected features points at each of the plurality of locations; and determining intrinsic parameters of the camera based on the matching pairs of the one or more detected feature points and the one or more projected feature points at the plurality of locations.

Example 5 includes the method of example 1, further comprising: filtering the matching pairs by: identifying a direction of a pair of one or more detected feature points and the one or more projected feature points, the direction indicating a radially outward direction from the one or more detected feature points to the one or more projected feature points, wherein determining intrinsic parameters of the camera is further based on the filtered matching pairs.

Example 6 includes the method of example 1, further comprising: filtering the matching pairs by: limiting a pixel changing range between one or more detected feature points and corresponding one or more projected feature points of a matching pair, wherein determining intrinsic parameters of the camera is further based on the filtered matching pairs.

Example 7 includes the method of example 1, further comprising: filtering the matching pairs by: limiting a pixel shifting based on a radial location of the one or more detected feature points, the pixel shifting being greater for a detected feature point that is further from the central region, wherein determining intrinsic parameters of the camera is further based on the filtered matching pairs.

Example 8 includes the method of example 1, further comprising: identifying a relationship between the intrinsic parameters and the temperature of the camera based on the matching pairs; and forming a temperature profile of the camera based on the relationship.

Example 9 includes the method of example 8, further comprising: measuring the temperature of the camera after the camera is turned on, the temperature of the camera being higher than the threshold; identifying intrinsic parameters of the camera based on the measured temperature of the camera and the temperature profile of the camera; and applying the identified intrinsic parameters to the projected features of the camera.

Example 10 includes the method of example 1, further comprising: storing the intrinsic parameters of the camera in a storage device of the visual tracking system, wherein the visual tracking system includes a visual-inertial simultaneous localization and mapping system that is used to track the one or more detected feature points.

Example 11 is a computing apparatus comprising: a processor; and a memory storing instructions that, when executed by the processor, configure the apparatus to: access a temperature of a camera of the visual tracking system; detect that the temperature of the camera exceeds a threshold that is based on a factory calibration temperature of the camera; in response to detecting that the temperature of the camera exceeds the threshold, identify one or more feature points that are located in a central region of an initial image generated by the camera; generate a graphical user interface element that instructs a user of the visual tracking system to move the visual tracking system towards a border region of the initial image; track, using the visual tracking system, one or more detected feature points in a border region of a second image generated by the camera, the border region of the second image corresponding to the central region of the initial image; calculate one or more projected feature points in the border region of the second image based on factory intrinsic calibration parameters of the visual tracking system; match pairs of the one or more detected feature points in the border region of the second image with the corresponding one or more projected features points in the border region of the second image; and determine intrinsic parameters of the camera based on the matching pairs of the one or more detected feature points in the border region of the second image and the one or more projected feature points in the border region of the second image.

Example 12 includes the computing apparatus of example 11, wherein the instructions further configure the apparatus to: display the graphical user interface element in a display of the visual tracking system, the graphical user interface element comprising a vector that indicates a direction and a magnitude of displacement of the visual tracking system, wherein the direction points to the border region of the initial image, wherein the magnitude of displacement is based on an angular rotation between the central region of the initial image and the border region of the initial image.

Example 13 includes the computing apparatus of example 11, wherein the instructions further configure the apparatus to: in response to detecting that the temperature of the camera exceeds the threshold, identify a number of feature points corresponding to a 3D location exceeds a feature point threshold; and guide the user to direct the visual tracking system so that the 3D location is located in the central region of the initial image.

Example 14 includes the computing apparatus of example 11, wherein the instructions further configure the apparatus to: identify a plurality of locations in the border region of the initial image, the plurality of locations being dispersed throughout a perimeter of the initial image; direct the graphical user interface element to sequentially move the visual tracking system so that the one or more detected featured points are sequentially visible at each of the plurality of locations; track, using the visual tracking system, the one or more detected feature points at each of the plurality of locations and a corresponding pose of the visual tracking system at each of the plurality of locations; calculate one or more projected feature points at each of the plurality of locations using factory intrinsic calibration parameters of the visual tracking system; match pairs of the one or more detected feature points at each of the plurality of locations with the corresponding one or more projected features points at each of the plurality of locations; and determine intrinsic parameters of the camera based on the matching pairs of the one or more detected feature points and the one or more projected feature points at the plurality of locations.

Example 15 includes the computing apparatus of example 11, wherein the instructions further configure the apparatus to: filter the matching pairs by: identify a direction of a pair of one or more detected feature points and the one or more projected feature points, the direction indicating a radially outward direction from the one or more detected feature points to the one or more projected feature points, wherein determining intrinsic parameters of the camera is further based on the filtered matching pairs.

Example 16 includes the computing apparatus of example 11, wherein the instructions further configure the apparatus to: filter the matching pairs by: limit a pixel changing range between one or more detected feature points and corresponding one or more projected feature points of a matching pair, wherein determining intrinsic parameters of the camera is further based on the filtered matching pairs.

Example 17 includes the computing apparatus of example 11, wherein the instructions further configure the apparatus to: filter the matching pairs by: limit a pixel shifting based on a radial location of the one or more detected feature points, the pixel shifting being greater for a detected feature point that is further from the central region, wherein determining intrinsic parameters of the camera is further based on the filtered matching pairs.

Example 18 includes the computing apparatus of example 11, wherein the instructions further configure the apparatus to: identify a relationship between the intrinsic parameters and the temperature of the camera based on the matching pairs; and form a temperature profile of the camera based on the relationship.

Example 19 includes the computing apparatus of example 18, wherein the instructions further configure the apparatus to: measure the temperature of the camera after the camera is turned on, the temperature of the camera being higher than the threshold; identify intrinsic parameters of the camera based on the measured temperature of the camera and the temperature profile of the camera; and apply the identified intrinsic parameters to the projected features of the camera.

Example 20 is a non-transitory computer-readable storage medium, the computer-readable storage medium including instructions that when executed by a computer, cause the computer to: access a temperature of a camera of the visual tracking system; detect that the temperature of the camera exceeds a threshold that is based on a factory calibration temperature of the camera; in response to detecting that the temperature of the camera exceeds the threshold, identify one or more feature points that are located in a central region of an initial image generated by the camera; generate a graphical user interface element that instructs a user of the visual tracking system to move the visual tracking system towards a border region of the initial image; track, using the visual tracking system, one or more detected feature points in a border region of a second image generated by the camera, the border region of the second image corresponding to the central region of the initial image; calculate one or more projected feature points in the border region of the second image based on factory intrinsic calibration parameters of the visual tracking system; match pairs of the one or more detected feature points in the border region of the second image with the corresponding one or more projected features points in the border region of the second image; and determine intrinsic parameters of the camera based on the matching pairs of the one or more detected feature points in the border region of the second image and the one or more projected feature points in the border region of the second image.

What is claimed is:

1. A method for calibrating a visual tracking system comprising:
    accessing a temperature of a camera of the visual tracking system;
    detecting that the temperature of the camera exceeds a threshold that is based on a factory calibration temperature of the camera;
    in response to detecting that the temperature of the camera exceeds the threshold, identifying one or more feature points that are located in a central region of an initial image generated by the camera;
    generating a graphical user interface element that instructs a user of the visual tracking system to move the visual tracking system towards a border region of the initial image;
    tracking, using the visual tracking system, one or more detected feature points in a border region of a second image generated by the camera, the border region of the second image corresponding to the central region of the initial image;
    calculating one or more projected feature points in the border region of the second image based on factory intrinsic calibration parameters of the visual tracking system;
    matching pairs of the one or more detected feature points in the border region of the second image with the corresponding one or more projected features points in the border region of the second image; and
    determining intrinsic parameters of the camera based on the matching pairs of the one or more detected feature points in the border region of the second image and the one or more projected feature points in the border region of the second image.

2. The method of claim 1, further comprising:
    displaying the graphical user interface element in a display of the visual tracking system, the graphical user interface element comprising a vector that indicates a direction and a magnitude of displacement of the visual tracking system, wherein the direction points to the border region of the initial image, wherein the magnitude of displacement is based on an angular rotation between the central region of the initial image and the border region of the initial image.

3. The method of claim 1, further comprising:
    in response to detecting that the temperature of the camera exceeds the threshold, identifying a number of feature points corresponding to a 3D location exceeds a feature point threshold; and guiding the user to direct the visual tracking system so that the 3D location is located in the central region of the initial image.

4. The method of claim 1, further comprising:
identifying a plurality of locations in the border region of the initial image, the plurality of locations being dispersed throughout a perimeter of the initial image;
directing the graphical user interface element to sequentially move the visual tracking system so that the one or more detected featured points are sequentially visible at each of the plurality of locations;
tracking, using the visual tracking system, the one or more detected feature points at each of the plurality of locations and a corresponding pose of the visual tracking system at each of the plurality of locations;
calculating one or more projected feature points at each of the plurality of locations using factory intrinsic calibration parameters of the visual tracking system;
matching pairs of the one or more detected feature points at each of the plurality of locations with the corresponding one or more projected features points at each of the plurality of locations; and
determining intrinsic parameters of the camera based on the matching pairs of the one or more detected feature points and the one or more projected feature points at the plurality of locations.

5. The method of claim 1, further comprising:
filtering the matching pairs by:
identifying a direction of a pair of one or more detected feature points and the one or more projected feature points, the direction indicating a radially outward direction from the one or more detected feature points to the one or more projected feature points,
wherein determining intrinsic parameters of the camera is further based on the filtered matching pairs.

6. The method of claim 1, further comprising:
filtering the matching pairs by:
limiting a pixel changing range between one or more detected feature points and corresponding one or more projected feature points of a matching pair,
wherein determining intrinsic parameters of the camera is further based on the filtered matching pairs.

7. The method of claim 1, further comprising:
filtering the matching pairs by:
limiting a pixel shifting based on a radial location of the one or more detected feature points, the pixel shifting being greater for a detected feature point that is further from the central region,
wherein determining intrinsic parameters of the camera is further based on the filtered matching pairs.

8. The method of claim 1, further comprising:
identifying a relationship between the intrinsic parameters and the temperature of the camera based on the matching pairs; and
forming a temperature profile of the camera based on the relationship.

9. The method of claim 8, further comprising:
measuring the temperature of the camera after the camera is turned on, the temperature of the camera being higher than the threshold;
identifying intrinsic parameters of the camera based on the measured temperature of the camera and the temperature profile of the camera; and
applying the identified intrinsic parameters to the projected features of the camera.

10. The method of claim 1, further comprising:
storing the intrinsic parameters of the camera in a storage device of the visual tracking system, wherein the visual tracking system includes a visual-inertial simultaneous localization and mapping system that is used to track the one or more detected feature points.

11. A computing apparatus comprising:
a processor; and
a memory storing instructions that, when executed by the processor, configure the apparatus to:
access a temperature of a camera of a visual tracking system;
detect that the temperature of the camera exceeds a threshold that is based on a factory calibration temperature of the camera;
in response to detecting that the temperature of the camera exceeds the threshold, identify one or more feature points that are located in a central region of an initial image generated by the camera;
generate a graphical user interface element that instructs a user of the visual tracking system to move the visual tracking system towards a border region of the initial image;
track, using the visual tracking system, one or more detected feature points in a border region of a second image generated by the camera, the border region of the second image corresponding to the central region of the initial image;
calculate one or more projected feature points in the border region of the second image based on factory intrinsic calibration parameters of the visual tracking system;
match pairs of the one or more detected feature points in the border region of the second image with the corresponding one or more projected features points in the border region of the second image; and
determine intrinsic parameters of the camera based on the matching pairs of the one or more detected feature points in the border region of the second image and the one or more projected feature points in the border region of the second image.

12. The computing apparatus of claim 11, wherein the instructions further configure the apparatus to:
display the graphical user interface element in a display of the visual tracking system, the graphical user interface element comprising a vector that indicates a direction and a magnitude of displacement of the visual tracking system, wherein the direction points to the border region of the initial image, wherein the magnitude of displacement is based on an angular rotation between the central region of the initial image and the border region of the initial image.

13. The computing apparatus of claim 11, wherein the instructions further configure the apparatus to:
in response to detecting that the temperature of the camera exceeds the threshold, identify a number of feature points corresponding to a 3D location exceeds a feature point threshold; and
guide the user to direct the visual tracking system so that the 3D location is located in the central region of the initial image.

14. The computing apparatus of claim 11, wherein the instructions further configure the apparatus to:
identify a plurality of locations in the border region of the initial image, the plurality of locations being dispersed throughout a perimeter of the initial image;

direct the graphical user interface element to sequentially move the visual tracking system so that the one or more detected featured points are sequentially visible at each of the plurality of locations;

track, using the visual tracking system, the one or more detected feature points at each of the plurality of locations and a corresponding pose of the visual tracking system at each of the plurality of locations;

calculate one or more projected feature points at each of the plurality of locations using factory intrinsic calibration parameters of the visual tracking system;

match pairs of the one or more detected feature points at each of the plurality of locations with the corresponding one or more projected features points at each of the plurality of locations; and determine intrinsic parameters of the camera based on the matching pairs of the one or more detected feature points and the one or more projected feature points at the plurality of locations.

15. The computing apparatus of claim 11, wherein the instructions further configure the apparatus to:

filter the matching pairs by:
identify a direction of a pair of one or more detected feature points and the one or more projected feature points, the direction indicating a radially outward direction from the one or more detected feature points to the one or more projected feature points,
wherein determining intrinsic parameters of the camera is further based on the filtered matching pairs.

16. The computing apparatus of claim 11, wherein the instructions further configure the apparatus to:

filter the matching pairs by:
limit a pixel changing range between one or more detected feature points and corresponding one or more projected feature points of a matching pair,
wherein determining intrinsic parameters of the camera is further based on the filtered matching pairs.

17. The computing apparatus of claim 11, wherein the instructions further configure the apparatus to:

filter the matching pairs by:
limit a pixel shifting based on a radial location of the one or more detected feature points, the pixel shifting being greater for a detected feature point that is further from the central region,
wherein determining intrinsic parameters of the camera is further based on the filtered matching pairs.

18. The computing apparatus of claim 11, wherein the instructions further configure the apparatus to:

identify a relationship between the intrinsic parameters and the temperature of the camera based on the matching pairs; and form a temperature profile of the camera based on the relationship.

19. The computing apparatus of claim 18, wherein the instructions further configure the apparatus to:

measure the temperature of the camera after the camera is turned on, the temperature of the camera being higher than the threshold;

identify intrinsic parameters of the camera based on the measured temperature of the camera and the temperature profile of the camera; and apply the identified intrinsic parameters to the projected features of the camera.

20. A non-transitory computer-readable storage medium, the computer-readable storage medium including instructions that when executed by a computer, cause the computer to:

access a temperature of a camera of a visual tracking system;

detect that the temperature of the camera exceeds a threshold that is based on a factory calibration temperature of the camera;

in response to detecting that the temperature of the camera exceeds the threshold, identify one or more feature points that are located in a central region of an initial image generated by the camera;

generate a graphical user interface element that instructs a user of the visual tracking system to move the visual tracking system towards a border region of the initial image;

track, using the visual tracking system, one or more detected feature points in a border region of a second image generated by the camera, the border region of the second image corresponding to the central region of the initial image;

calculate one or more projected feature points in the border region of the second image based on factory intrinsic calibration parameters of the visual tracking system;

match pairs of the one or more detected feature points in the border region of the second image with the corresponding one or more projected features points in the border region of the second image; and determine intrinsic parameters of the camera based on the matching pairs of the one or more detected feature points in the border region of the second image and the one or more projected feature points in the border region of the second image.

* * * * *